United States Patent
Kozaki

(10) Patent No.: US 8,941,856 B2
(45) Date of Patent: Jan. 27, 2015

(54) IMAGE PROCESSING APPARATUS, IMAGE PROCESSING METHOD, AND NON-TRANSITORY COMPUTER-READABLE RECORDING MEDIUM ENCODED WITH IMAGE PROCESSING PROGRAM

(71) Applicant: Yousuke Kozaki, Amagasaki (JP)

(72) Inventor: Yousuke Kozaki, Amagasaki (JP)

(73) Assignee: Konica Minolta Business Technologies, Inc., Chiyoda-Ku, Tokyo (JP)

(*) Notice: Subject to any disclaimer, the term of this patent is extended or adjusted under 35 U.S.C. 154(b) by 41 days.

(21) Appl. No.: 13/800,886

(22) Filed: Mar. 13, 2013

(65) Prior Publication Data

US 2013/0242345 A1    Sep. 19, 2013

(30) Foreign Application Priority Data

Mar. 16, 2012   (JP) ................................ 2012-059866

(51) Int. Cl.
G06F 3/12       (2006.01)
G06K 15/00    (2006.01)
(Continued)

(52) U.S. Cl.
CPC ......... H04N 1/0097 (2013.01); H04N 1/00408 (2013.01); H04N 1/00464 (2013.01);
(Continued)

(58) Field of Classification Search
CPC .................. H04N 1/0035; H04N 1/00464
USPC .............. 358/1.1, 1.15, 1.13, 1.16, 1.18, 527,
358/528, 530, 537, 448, 451, 452, 305;
382/112, 162, 276, 286, 293, 295, 296,
382/297, 298, 305, 307, 309, 311; 710/72,
710/73; 715/200, 205, 208, 234, 237, 236,
715/240, 241, 243, 246, 248, 251, 252, 253,
715/255, 272, 273, 274, 700, 705, 733, 738,
715/740, 744, 748, 749, 750, 760, 764, 711,
715/781, 809, 817, 828, 829, 864, 867, 961,
715/965, 966, 970
See application file for complete search history.

(56) References Cited

U.S. PATENT DOCUMENTS 8,014,016 B2 *  9/2011  Nakajima .................... 358/1.15
8,031,980 B2 * 10/2011  Hattori et al. ................. 382/305
(Continued)

FOREIGN PATENT DOCUMENTS

JP         06-350817 A     12/1994
JP       2000-078378 A      3/2000
(Continued)

OTHER PUBLICATIONS

Office Action (Notice of Ground of Rejection) issued on Apr. 1, 2014, by the Japan Patent Office in corresponding Japanese Patent Application No. 2012-059866, and an English Translation of the Office Action. (4 pages).

*Primary Examiner* — Firmin Backer
*Assistant Examiner* — Jonathan Beckley
(74) *Attorney, Agent, or Firm* — Buchanan Ingersoll & Rooney PC

(57) ABSTRACT

An image processing apparatus includes a target determining portion to determine process target data, an image processing control portion that stores processed data obtained by image-processing the process target data when the process target data can be stored upon acceptance of an execution operation, a history storing portion that stores history information including processing identification information of the image processing when the process target data cannot be stored, and a page generating portion that generates a page including a command linked to the process target data. The target determining portion determines designated data as the process target data upon acceptance of a data designating operation, and determines processed data as the process target data after the process target data is image-processed. When history information is stored, the page generating portion generates the page further including an image processing command to perform the image processing on the process target data.

20 Claims, 10 Drawing Sheets

(51) Int. Cl.
*G06F 3/00* (2006.01)
*G06K 9/03* (2006.01)
*H04N 1/00* (2006.01)
*H04N 1/32* (2006.01)

(52) U.S. Cl.
CPC .... *H04N1/32112* (2013.01); *H04N 2201/3242* (2013.01); *H04N 2201/0094* (2013.01); *H04N 2201/3274* (2013.01); *H04N 2201/3202* (2013.01)

USPC ....... 358/1.14; 358/1.13; 358/1.15; 358/1.16; 715/760; 382/311

(56) References Cited

U.S. PATENT DOCUMENTS

| | | | |
|---|---|---|---|
| 8,264,711 B2 * | 9/2012 | Takahashi | 358/1.15 |
| 2002/0097418 A1 * | 7/2002 | Chang et al. | 358/1.13 |
| 2006/0274190 A1 | 12/2006 | Kalevo | |
| 2011/0292426 A1 * | 12/2011 | Sasano et al. | 358/1.13 |
| 2012/0092705 A1 * | 4/2012 | Min et al. | 358/1.15 |
| 2013/0100475 A1 * | 4/2013 | Kuroyanagi | 358/1.13 |

FOREIGN PATENT DOCUMENTS

| | | |
|---|---|---|
| JP | 2008-543203 | 11/2008 |
| JP | 2010-178283 | 8/2010 |
| JP | 2010-219920 | 9/2010 |

* cited by examiner

F I G. 6

300

| document1.jpg | SELECT | PRINT WITHOUT MODIFICATION |
| document2.jpg | SELECT | PRINT WITHOUT MODIFICATION |
| document3.jpg | SELECT | PRINT WITHOUT MODIFICATION |
| document4.jpg | SELECT | PRINT WITHOUT MODIFICATION |
| document5.jpg | SELECT | PRINT WITHOUT MODIFICATION |

F I G. 7

310   317 document1.jpg   RETURN   PRINT IN THIS CONDITION

ROTATE IMAGE
  90 DEGREES TO THE LEFT
  90 DEGREES TO THE RIGHT        } 313

SCALING
  150%
  120%
  80%
  50%                            } 315

```
<html>
    <head>
        <title>temp process</title>
        <script>
    var cv, ctx, rot_deg, rot;
                    var img = new Image();
            401 ——— img.src = "document1.jpg";
                    //ROTATE ORIGINAL IMAGE (UPRIGHT HOUSE) 90 DEGREES,
                    REDUCE TO 80% OF ITS ORIGINAL SIZE(Javascript)
                    function temp_process() {
                            cv = document.getElementById("canvas");
                            ctx = cv.getContext("2d");
                            ctx.fillStyle = "rgb(255, 255, 255)";
                            ctx.fillRect(0, 0, cv.width, cv.height);
                            ctx.save();

/*ROTATE IMAGE*/
                          ┌ ctx.translate(cv.width/2, cv.height/2);
                          │ rot_deg = 90;
            402 ——————————┤ rot = rot_deg/180*Math.PI;
                          │ ctx.rotate(rot);
                          └ ctx.translate(-img.width/2, -img.height/2);

403 ——————————/*REDUCE IMAGE*/
                          ctx.scale(0.8, 0.8);

404 ——————————ctx.drawImage(img, 0, 0);
                            ctx.restore();
                    }
        </script>
    </head>
    <body onload="temp_process();">
            <canvas id ="canvas" with = "200" height = "200" style =
"border:1px solid #ff66ff"></canvas>
    </body>
</html>
```

F I G. 1 1
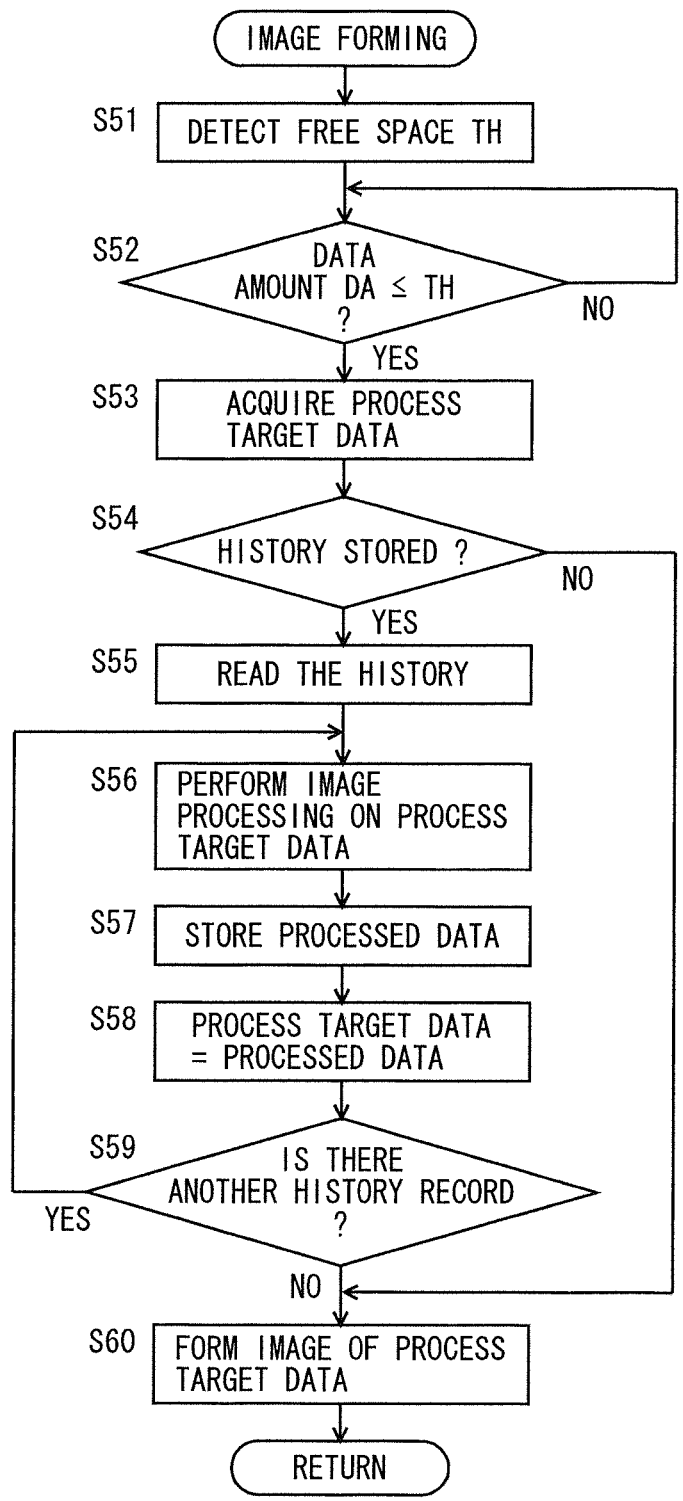

IMAGE PROCESSING APPARATUS, IMAGE PROCESSING METHOD, AND NON-TRANSITORY COMPUTER-READABLE RECORDING MEDIUM ENCODED WITH IMAGE PROCESSING PROGRAM

This application is based on Japanese Patent Application No. 2012-059866 filed with Japan Patent Office on Mar. 16, 2012, the entire content of which is hereby incorporated by reference.

BACKGROUND OF THE INVENTION

1. Field of the Invention

The present invention relates to an image processing apparatus, an image processing method, and a non-transitory computer-readable recording medium encoded with an image processing program. More particularly, the present invention relates to an image processing apparatus to which an application program is installed, an image processing method executed in the image processing apparatus, and a non-transitory computer-readable recording medium encoded with an image processing program for causing a computer to execute the image processing method.

2. Description of the Related Art

Some recent image processing apparatuses, typified by multi-function peripherals (MFPs), include a storage device such as a hard disk drive (HDD), so that they can store image data. However, there is a limit to the amount of data which can be stored in a HDD; data cannot be stored beyond the limit.

As a technique for coping with this problem, Japanese Patent Laid-Open No. 2010-178283 discloses an image reading device which stores images that the device had read through scanning, into an external storage medium. The image reading device detects the storage capacity of the external storage medium mounted thereon, and selectably displays, out of reading conditions settable, the reading conditions that allow an image to be generated with its estimated file size not exceeding the storage capacity. The estimated file size is determined on the basis of the reading conditions.

In the case where the storage capacity of the external storage medium is restricted, however, the conventional image reading device cannot store data with the reading conditions desired by a user.

On the other hand, some MFPs allow application programs to be installed therein. A user can customize an MFP by installing therein an application program according to the type of usage. In the case where an application program determines a process of storing data into a HDD, however, data cannot be stored beyond the storage capacity of the HDD. It is thus necessary for the application program to determine in advance a process to be performed when data cannot be stored into the HDD.

SUMMARY OF THE INVENTION

An aspect of the present invention provides an image processing apparatus which includes: a data storing portion to store data; an image processing portion to perform image processing on data; an operation accepting portion to accept an operation input by a user; a target determining portion to determine process target data; an image processing control portion operative, in the case where the process target data can be stored into the data storing portion at the time of acceptance by the operation accepting portion of an execution operation instructing execution of image processing executable by the image processing portion, to control the image processing portion to perform the image processing specified by the execution operation on the process target data, and store processed data as a result of the image processing into the data storing portion; a history storing portion operative, in the case where the process target data cannot be stored into the data storing portion at the time of acceptance of the execution operation, to store history information including processing identification information for identifying the image processing specified by the execution operation; and a page generating portion to generate a page written in a markup language and including a command linked to data that is specified by position information indicating a position where the process target data is stored; wherein at the time when a data designating operation of designating data is accepted by the operation accepting portion, the target determining portion determines the designated data as the process target data, and after the process target data has been image-processed by the image processing portion, the target determining portion determines the processed data stored in the data storing portion as the process target data, and wherein the page generating portion includes an image processing command generating portion operative, in the case where the history information is stored, to generate an image processing command to perform the image processing specified by the processing identification information included in the history information on the process target data, and the page generating portion generates the page further including the image processing command generated by the image processing command generating portion.

Another aspect of the present invention provides a non-transitory computer-readable recording medium encoded with an image processing program performed by a computer controlling an image processing apparatus, the image processing apparatus including a data storing portion to store data, and an image processing portion to perform image processing on data, the computer including an application portion to perform an application program, the image processing program causing the computer to perform: a target determining step of determining process target data; an execution step of, in the case where the process target data can be stored into the data storing portion at the time of acceptance by the application portion of an execution operation instructing execution of image processing executable by the image processing portion, controlling the image processing portion to perform the image processing the execution of which has been instructed on the process target data; a processed data storing step of storing processed data as a result of the image processing by the image processing portion into the data storing portion; and a history storing step of, in the case where the process target data cannot be stored into the data storing portion at the time of acceptance by the application portion of the execution operation, storing history information including processing identification information for identifying the image processing specified by the execution operation; wherein the target determining step includes a step of, at the time when a data designating operation of designating data is accepted by the application portion, determining the designated data as the process target data, a step of, after the process target data has been image-processed in the execution step, determining the processed data stored in the data storing portion as the process target data, and a step of, each time the execution operation is accepted, outputting, to the application portion, target data identification information for identifying the processed data determined as the process target data, and, in the case where the history information is stored, also outputting, to the application portion, history information identification information for identifying the history information so as to instruct execution of the image processing on the basis of the history information.

A further aspect of the present invention provides an image processing method executed in an image processing apparatus, the image processing apparatus including a data storing portion to store data, and an image processing portion to perform image processing on data, the computer including an application portion to execute an application program, the image processing method causing the computer to perform: a target determining step of determining process target data; an execution step of, in the case where the process target data can be stored into the data storing portion at the time of acceptance by the application portion of an execution operation instructing execution of image processing executable by the image processing portion, controlling the image processing portion to perform the image processing specified by the execution operation on the process target data; a processed data storing step of storing processed data as a result of the image processing by the image processing portion into the data storing portion; and a history storing step of, in the case where the process target data cannot be stored into the data storing portion at the time of acceptance by the application portion of the execution operation, storing history information including processing identification information for identifying the image processing specified by the execution operation; wherein the target determining step includes a step of, at the time when a data designating operation of designating data is accepted by the application portion, determining the designated data as the process target data, a step of, after the process target data has been image-processed in the execution step, determining the processed data stored in the data storing portion as the process target data, and a step of, each time the execution operation is accepted, outputting target data identification information for identifying the processed data determined as the process target data to the application portion.

The foregoing and other features, aspects, and advantages of the present invention will become more apparent from the following detailed description of the present invention when taken in conjunction with the accompanying drawings.

BRIEF DESCRIPTION OF THE DRAWINGS

FIG. 6 shows an example of a data designating screen;

FIG. 7 shows an example of a preview screen;

FIG. 8 shows an example of a web page to which a display command and first and second image processing commands have been added;

FIG. 11 is a flowchart illustrating an example of the flow of an image forming process.

DESCRIPTION OF THE PREFERRED EMBODIMENTS

Figure 1:
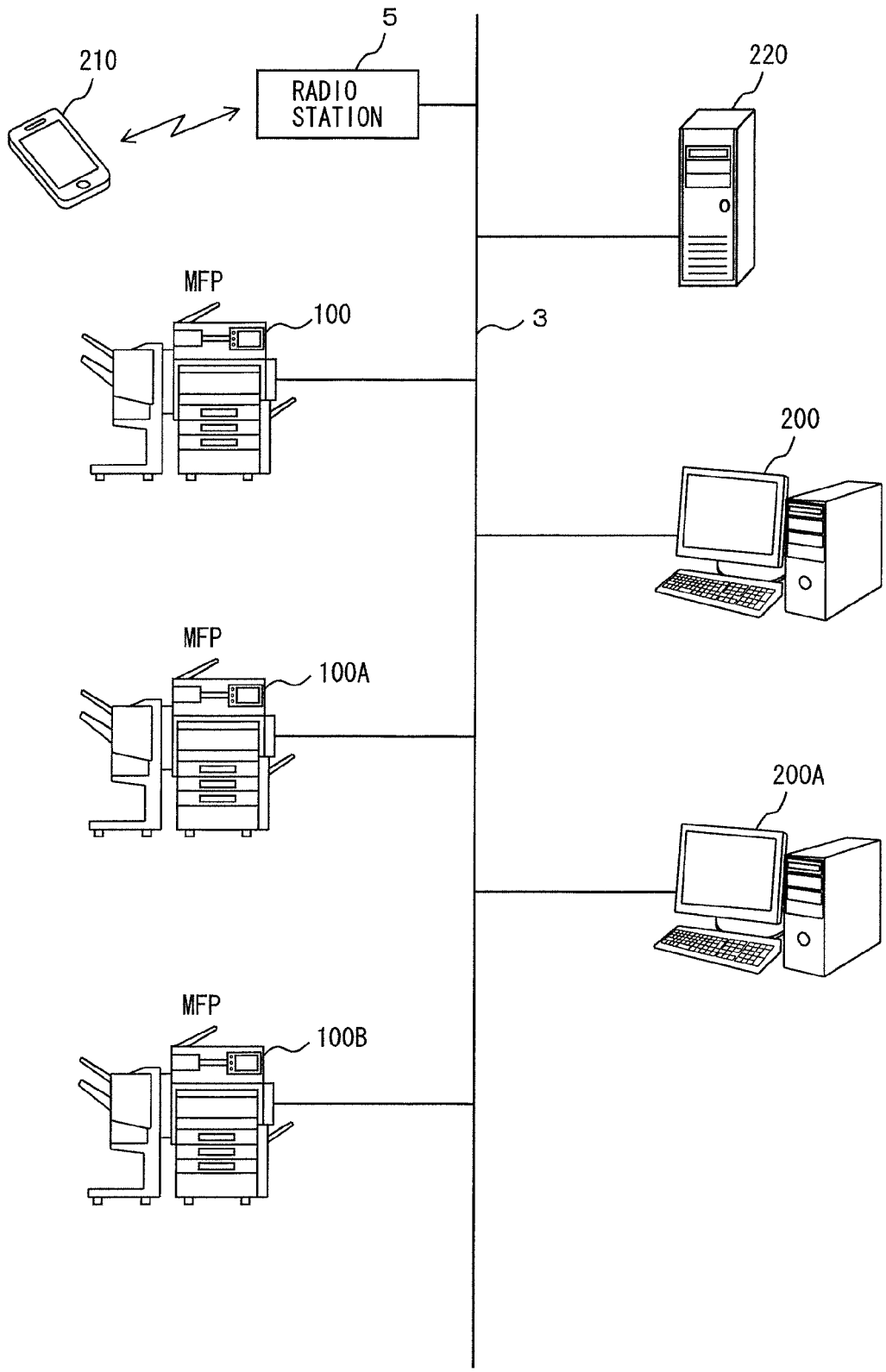
FIG. 1 schematically shows an image processing system according to an embodiment of the present invention.

The preferred embodiments of the present invention will be described below in conjunction with the drawings. In the following description, the same or corresponding parts are denoted by the same reference characters. Their names and functions are also the same. Thus, a detailed description thereof will not be repeated.

FIG. 1 schematically shows an image processing system according to an embodiment of the present invention. Referring to FIG. 1, an image processing system 1 includes multifunction peripherals (MFPs) 100, 100A, and 100B, a mobile information device 210, a radio station 5, personal computers (PCs) 200 and 200A, and a file server 220. MFPs 100, 100A, and 100B, radio station 5, PCs 200 and 200A, and file server 220 are each connected to a network 3. Therefore, MFPs 100, 100A, and 100B, radio station 5, PCs 200 and 200A, and file server 220 can communicate with each other via network 3.

Mobile information device 210 is a personal digital assistant (PDA) such as electronic paper or a smartphone, which has a communication function. It is here assumed that mobile information device 210 is a smartphone. Mobile information device 210 communicates with a cellular base station in a wireless manner so as to be connected to a mobile telephone network for conversation. Mobile information device 210 also has a wireless LAN function.

Radio station 5, which is a relay unit for network 3, communicates with mobile information device 210 having the wireless LAN communication function, to thereby connect mobile information device 210 to network 3. This enables mobile information device 210 to transmit data to and receive data from MFPs 100, 100A, and 100B which are connected to network 3.

Network 3 is a local area network (LAN), which may be connected in a wired or wireless manner. Network 3 is not necessarily the LAN; it may be a network that uses a wide area network (WAN), a public switched telephone network (PSTN), or the like. Further, network 3 is connected to the Internet. Therefore, MFPs 100, 100A, and 100B can each communicate with a computer, such as a server, connected to the Internet. The protocol for transmitting and receiving data for communication is not particularly limited; any protocol can be used.

While three MFPs 100, 100A, and 100B are connected as image processing apparatuses to network 3 in FIG. 1, the number of image processing apparatuses is not limited thereto; at least one apparatus may be connected to network 3. Further, the image processing apparatus is not limited to MFP 100, 100A, or 100B; it may be, e.g., a computer, facsimile machine, printer, or other device.

In image processing system 1 according to the present embodiment, a user may operate MFP 100, 100A, or 100B directly, or a user may operate mobile information device 210, PC 200, or PC 200A to thereby operate MFP 100, 100A, or 100B remotely. In the case where a user operates mobile information device 210, PC 200, or PC 200A to operate MFP 100, 100A, or 100B remotely, the MFP being remotely operated functions as a web server, while the mobile information device or the PC being operated functions as a client. In this case, a browsing program for downloading a web page for display is executed in that mobile information device 210, PC 200, or PC 200A.

Although hardware configurations respectively included in MFPs 100, 100A, and 100B may be different from each other, it is here assumed that MFP 100 has the same configuration as that included in at least one of MFPs 100A and 100B. Therefore, unless otherwise specified, MFP 100 will be described representatively.

Figure 2:
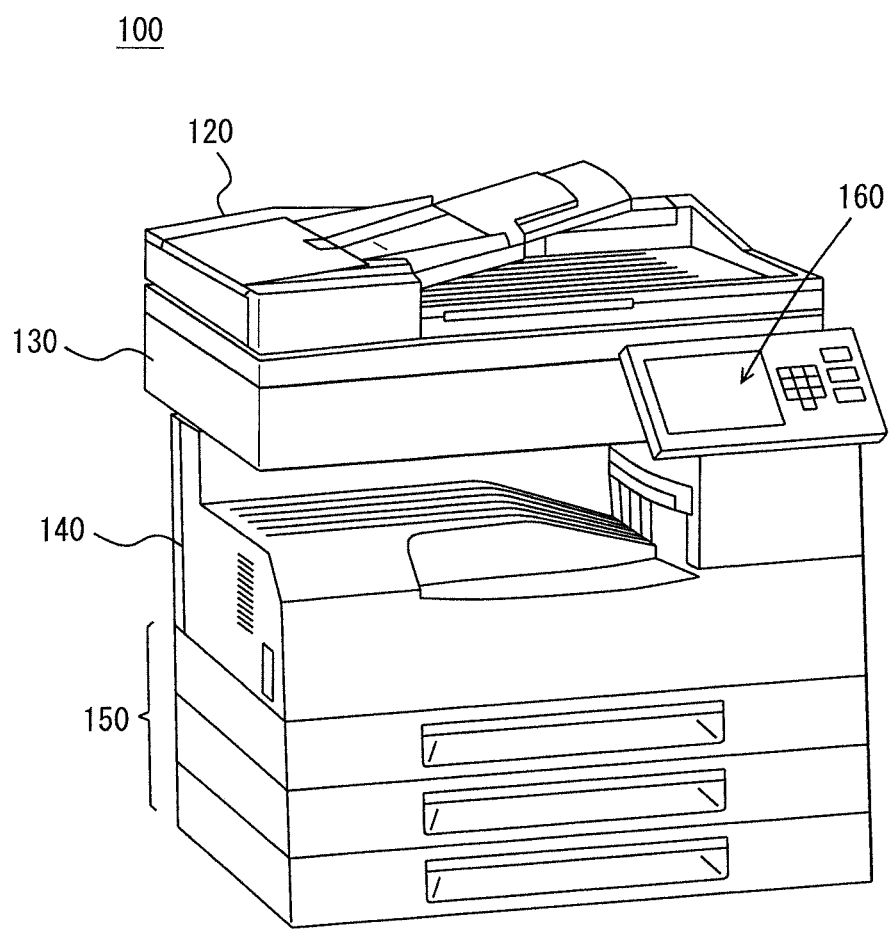
FIG. 2 is a perspective view of an MFP according to the embodiment of the present invention.
Figure 3:
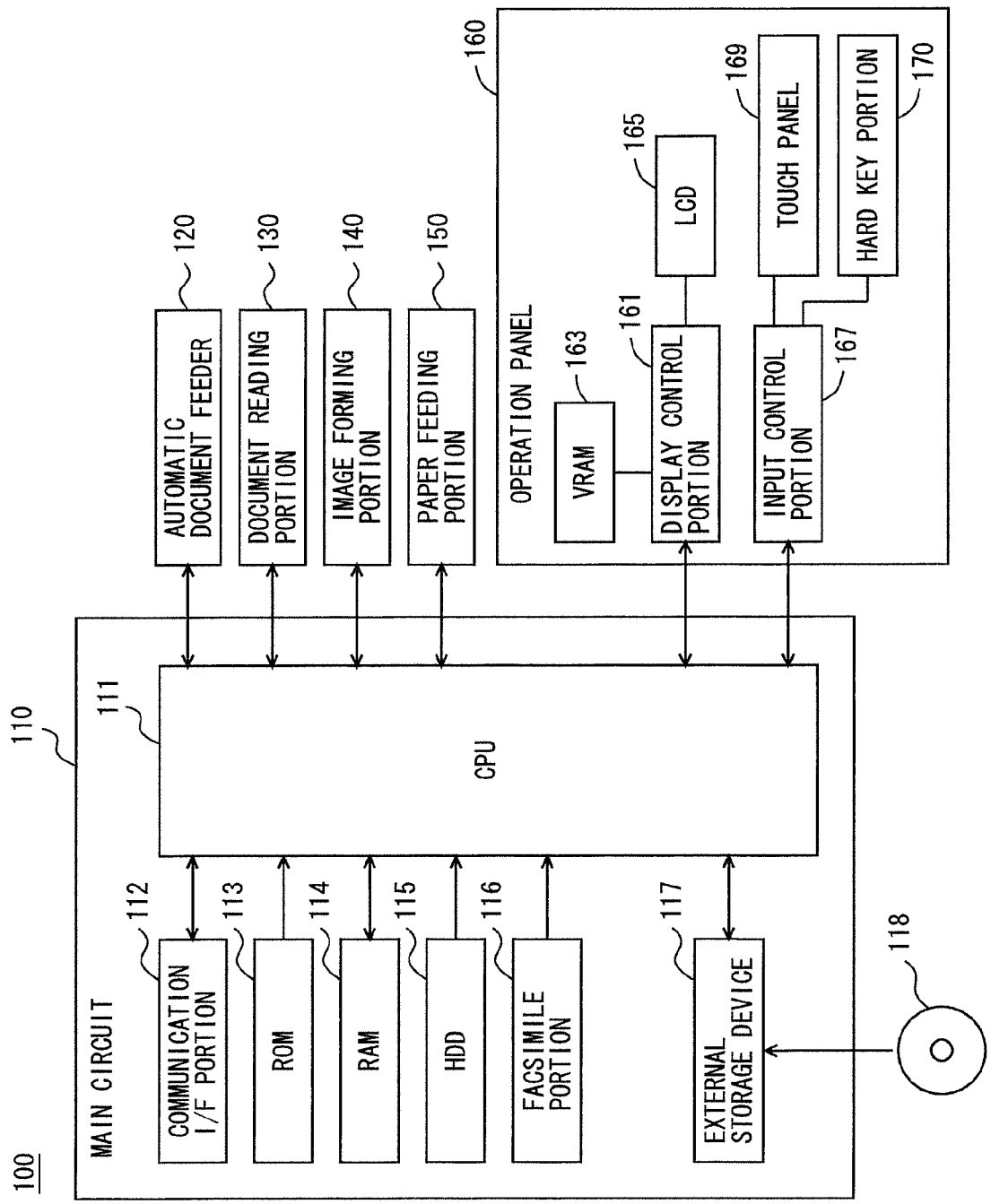
FIG. 3 is a block diagram schematically showing the hardware configuration of the MFP.

FIG. 2 is a perspective view of an MFP according to the present embodiment. FIG. 3 is a block diagram schematically showing the hardware configuration of the MFP. Referring to FIGS. 2 and 3, MFP 100 serving as an image processing apparatus includes: a main circuit 110; a document reading portion 130 for reading a document; an automatic document feeder 120 for feeding a document to document reading portion 130; an image forming portion 140 for forming an image on a sheet of paper or the like on the basis of image data which is output from document reading portion 130 that has read a document; a paper feeding portion 150 for feeding a sheet of paper to image forming portion 140; and an operation panel 160 serving as a user interface.

Main circuit 110 includes: a central processing unit (CPU) 111; a communication interface (I/F) portion 112; a read only memory (ROM) 113; a random access memory (RAM) 114; a hard disk drive (HDD) 115 as a mass storage; a facsimile portion 116; and an external storage device 117. CPU 111 is connected with automatic document feeder 120, document reading portion 130, image forming portion 140, paper feeding portion 150, and operation panel 160, and is responsible for overall control of MFP 100.

Automatic document feeder 120 automatically feeds a plurality of documents set on a document feed tray, one by one, to a predetermined document reading position set on a platen glass of document reading portion 130, and outputs the document, the image of which has been read by document reading portion 130, onto a document output tray. Document reading portion 130 includes an optical source which irradiates a document placed on the document reading position with light and a photoelectric conversion element which receives light reflected from the document, and scans a document image having a size corresponding to that of the document. The photoelectric conversion element converts the received light into image data made up of electric signals, and outputs the image data to image forming portion 140. Paper feeding portion 150 feeds a sheet of paper, stored in a paper feed tray, to image forming portion 140.

Image forming portion 140 forms an image using well-known electrophotography. Image forming portion 140 performs various kinds of data processing such as shading compensation on image data received from document reading portion 130 and, on the basis of the processed image data, or on the basis of externally received image data, forms an image on a sheet of paper fed by paper feeding portion 150.

Facsimile portion 116 is connected to public switched telephone networks (PSTN), and transmits facsimile data to or receives facsimile data from the PSTN. Facsimile portion 116 stores the received facsimile data in HDD 115. Alternatively, facsimile portion 116 converts the data into print data which can be printed in image forming portion 140, and outputs the same to image forming portion 140. This enables image forming portion 140 to form an image on a sheet of paper on the basis of the facsimile data received by facsimile portion 116. Further, facsimile portion 116 converts the data stored in HDD 115 to facsimile data, and transmits the same to a facsimile machine connected to the PSTN.

Communication I/F portion 112 is an interface for connecting MFP 100 to a network. Communication I/F portion 112 communicates with another computer or image processing apparatus connected to the network, using a communication protocol such as the transmission control protocol (TCP) or the file transfer protocol (FTP). The network to which communication I/F portion 112 is connected is a local area network (LAN). It may be connected in a wired or wireless manner. The network is not necessarily the LAN; it may be a wide area network (WAN), public switched telephone networks (PSTN), the Internet, or the like.

ROM 113 stores a program to be executed by CPU 111 or data necessary for execution of the program. RAM 114 is used as a work area when CPU 111 executes a program. Further, RAM 114 temporarily stores read images continuously transmitted from document reading portion 130.

Operation panel 160 includes: a liquid crystal display (LCD) 165; a display control portion 161 which controls display on LCD 165; a video RAM (VRAM) 163; a touch panel 169; a hard key portion 170; and an input control portion 167 which controls touch panel 169 and hard key portion 170. LCD 165 and hard key portion 170 are arranged on an upper surface of MFP 100.

Display control portion 161 is connected to CPU 111, VRAM 163, and LCD 165. VRAM 163 is used as a work area of display control portion 161, and temporarily stores an image to be displayed on LCD 165. Display control portion 161, which is controlled by CPU 111, controls LCD 165 to cause it to display the image stored in VRAM 163. Display control portion 161 causes LCD 165 to display an operation screen which will be described later.

Hard key portion 170 includes a plurality of hard keys. The hard keys, which are contact switches, are connected to input control portion 167. When a hard key is depressed by an operation user, the key closes its contact to thereby close a circuit that is connected to input control portion 167. Each hard key closes the circuit while being depressed by an operation user who operates MFP 100, whereas it opens the circuit while not being depressed by the operation user.

Touch panel 169 is disposed on an upper or lower surface of LCD 165, and outputs the coordinates of a position pushed by the operation user, to input control portion 167. Touch panel 169 detects the position designated by the operation user with his/her finger or a stylus pen, and outputs the coordinates of the detected position to input control portion 167. Touch panel 169 preferably has a size equal to or greater than that of the display surface of LCD 165. As touch panel 169 is disposed on the surface of LCD 165, when an operation user designates a position on the display surface of LCD 165, touch panel 169 outputs the coordinates of the position that the operation user has designated on the display surface of LCD 165, to input control portion 167. The touch panel may be, for example, of a resistive type, a surface acoustic wave type, an infrared ray type, an electromagnetic induction type, or a capacitance type, although it is not limited to these types.

If there is any hard key that closed the circuit in hard key portion 170, input control portion 167 outputs identification information for identifying the hard key that closed the circuit, to CPU 111. When touch panel 169 detects a position designated by an operation user, input control portion 167 outputs the coordinates that are output from touch panel 169, as position information indicating the position on the display surface of LCD 165, to CPU 111.

External storage device 117, which is controlled by CPU 111, is mounted with a compact disc read-only memory (CD-ROM) 118 or a semiconductor memory. CPU 111 is capable of accessing CD-ROM 118 or the semiconductor memory via external storage device 117. CPU 111 loads a program recorded on CD-ROM 118 or the semiconductor memory mounted on external storage device 117, into RAM 114 for execution. It is noted that the program executed by CPU 111 is not restricted to the program recorded on CD-ROM 118. CPU 111 may load a program stored in HDD 115, into RAM 114 for execution. In this case, another computer that is connected to a network may rewrite the program stored in HDD 115 of MFP 100, or additionally write a new program therein, via the network to which communication I/F portion 112 is connected. Further, MFP 100 may download a program from another computer connected to the network, and store the program in HDD 115. As used herein, the "program" includes, not only the program which CPU 111 can execute directly, but also a source program, a compressed program, an encrypted program, and so on.

It is noted that the medium for storing a program executed by CPU 111 is not restricted to CD-ROM 118. It may be an optical disc (magneto-optical (MO) disc, mini disc (MD), digital versatile disc (DVD)), an IC card, an optical card, or a semiconductor memory such as a mask ROM, an erasable programmable ROM (EPROM), an electrically erasable and programmable ROM (EEPROM), or the like.

Figure 4:
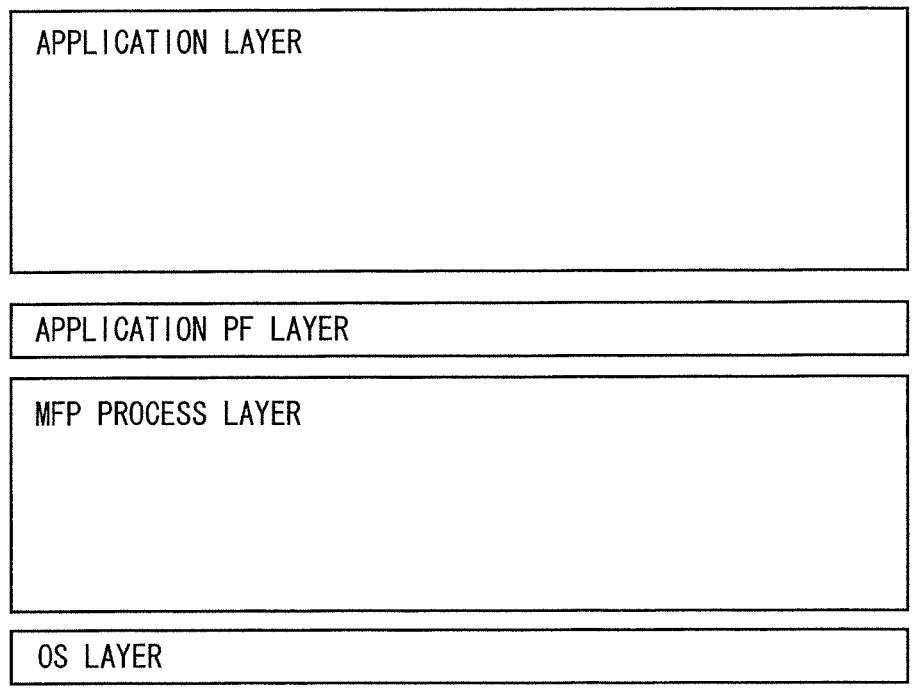
FIG. 4 shows an example of the software architecture of a CPU included in the MFP.

FIG. 4 shows an example of the software architecture of the CPU included in the MFP. Referring to FIG. 4, in CPU 111, an operating system (OS) layer is formed as the bottom layer, and an MFP process layer is formed above the OS layer. Above the MFP process layer, an application platform (PF) layer is formed, and an application layer is formed above the application PF layer.

A task for CPU 111 to execute an OS program belongs to the OS layer. The task belonging to the OS layer performs the process of controlling hardware resources of MFP 100. Here, the hardware resources include communication I/F portion 112, ROM 113, RAM 114, HDD 115, facsimile portion 116, external storage device 117, automatic document feeder 120, document reading portion 130, image forming portion 140, paper feeding portion 150, display control portion 161, and input control portion 167. The task belonging to the OS layer controls the hardware resources in accordance with an operating command input from the MFP process layer. Further, the OS layer shares, with the MFP process layer, operation identification information items for respectively identifying a plurality of types of operations that can be accepted by input control portion 167. When input control portion 167 detects an operation performed by an operation user, the task belonging to the OS layer outputs the operation identification information item for identifying the detected operation, to the MFP process layer.

A task for CPU 111 to execute an application program belongs to the application layer. In the case where two or more application programs are installed into MFP 100, two or more tasks for executing the respective application programs may belong to the application layer. The application programs include programs for customizing a user interface and the like so as to cause MFP 100 to perform the copying process, scanning process, printing process, facsimile transmitting/receiving process, data transmitting/receiving process, and so on. It is noted that the application programs are not restricted to the above-described programs; it may be another application program.

The task for executing an application program performs a plurality of types of processes determined by the application program. The plurality of types of processes include a process of causing a task belonging to the MFP process layer to perform a process to be performed in the MFP process layer. In the case of causing the task belonging to the MFP process layer to perform a process, the task for executing the application program outputs an application command. The application command is a command which has been released as an application program interface (API).

Further, the task for executing the application program specifies a process to be performed, from among the plurality of types of processes determined by the application program, on the basis of an instruction from the operation user who operates MFP 100. The task for executing the application program then performs the specified process. The instruction from the operation user who operates MFP 100 may be accepted in the OS layer when the operation user inputs the instruction by operating touch panel 169 and/or hard key portion 170. In the case where the operation user operates PC 200 or 200A to operate MFP 100 remotely, the instruction from the operation user may be accepted in the OS layer when communication I/F portion 112 receives the instruction from PC 200 or 200A operated by the operation user.

The application PF layer, located between the application layer and the MFP process layer, has belonging thereto a task for arbitrating a plurality of tasks belonging to the application layer. More specifically, in the case where there are two or more tasks belonging to the application layer, the application PF layer brings one of the tasks belonging to the application layer into a currently selected state in which data can be input/output. The application PF layer accepts an application command output from the task brought into the currently selected state among the tasks belonging to the application layer, and also outputs process identification information input from a task belonging to the MFP process layer, to the task in the currently selected state.

The MFP process layer, located between the application PF layer and the OS layer, has belonging thereto a task for CPU 111 to execute an image processing program. The MFP process layer has belonging thereto a task for converting an application command output from a task belonging to the application PF layer, into an operating command which can be interpreted by a task belonging to the OS layer, and outputting the operating command to the task belonging to the OS layer. While an application command is actually converted into one or more operating commands which can be executed by a task belonging to the OS layer, it is here assumed, for the convenience sake, that one application command is converted into one operating command executable by the task belonging to the OS layer. When the MFP process layer receives operation identification information from a task belonging to the OS layer, the MFP process layer outputs the operation identification information to the application PF layer.

As previously described, the application programs cause MFP 100 to perform the copying process, scanning process, printing process, facsimile transmitting/receiving process, data transmitting/receiving process, and so on. The following description will focus on the processes related to a user interface, among the processes that the application programs cause CPU 111 to perform.

Figure 5:
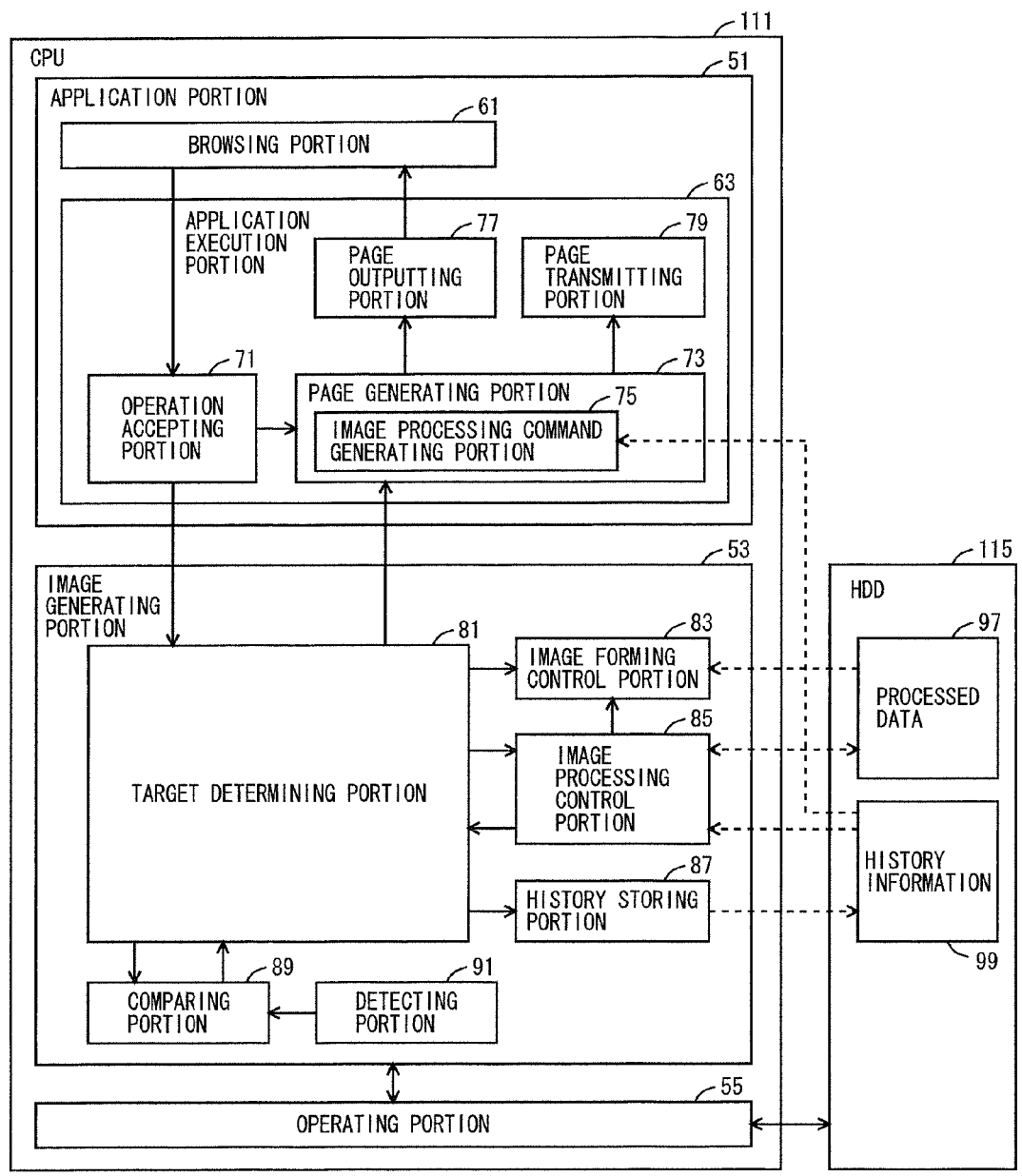
FIG. 5 is a block diagram showing, by way of example, the functions of the CPU included in the MFP, together with data stored in a HDD.

FIG. 5 is a block diagram showing, by way of example, the functions of the CPU included in the MFP, together with data stored in the HDD. The functions shown in FIG. 5 are implemented by CPU 111 included in MFP 100 as CPU 111 executes a program stored in ROM 113, HDD 115, or CD-ROM 118. More specifically, the functions are implemented by CPU 111 as CPU 111 executes an OS program, an image processing program, and an application program. The functions of CPU 111 shown here are those implemented when a browsing program and a print setup program have been installed in MFP 100 as the application programs.

Referring to FIG. 5, CPU 111 includes an application portion 51, an image generating portion 53, and an operating portion 55. Application portion 51 belongs to the application layer in the software architecture shown in FIG. 4. Application portion 51 includes a browsing portion 61 and an application execution portion 63. Browsing portion 61 is the function that is executed by a task for CPU 111 to execute a browsing program. Application execution portion 63 is the function that is executed by a task for CPU 111 to execute a print setup program.

Browsing portion 61 carries out the processing as a user interface when a user operates operation panel 160, and controls operation panel 160. More specifically, in response to input of a web page written in a markup language from application execution portion 63, browsing portion 61 controls display control portion 161 to display an image of the web page on LCD 165. When displaying the image of the web page on LCD 165, browsing portion 61 uses RAM 114 as a work area; it does not use HDD 115. Therefore, browsing portion 61 is able to display the web page, irrespective of the volume of free space available for storing data in HDD 115. Particularly, even in the case where a web page contains a display command linked to image data, the image of the web page is displayed by storing the linked image data in RAM 114, without the use of HDD 115.

In the state where an image of a web page is being displayed on LCD 165, when a user designates touch panel 169 or hard key portion 170, browsing portion 61 controls input control portion 167 to accept the designation by the user, and outputs to application execution portion 63 a command that has been determined in the web page corresponding to the position designated within the image of the web page. The command that is output from browsing portion 61 is, for example, a common gateway interface (CGI) command. It is noted that browsing portion 61 controls display control portion 161 and input control portion 167 via image generating portion 53 and operating portion 55.

Application execution portion 63 functions as a web server. A client may be browsing portion 61, or may be one of mobile information device 210, PC 200, and PC 200A. In the case where browsing portion 61 is the client, application execution portion 63 outputs a web page to browsing portion 61, and receives a CGI command from browsing portion 61. In response to reception of a CGI command from browsing portion 61, application execution portion 63 carries out the processing that corresponds to the CGI command. In the case of carrying out the processing of controlling hardware resources, application execution portion 63 outputs an application command to image generating portion 53. In the case where a command received from browsing portion 61 requests a new web page, application execution portion 63 generates a new web page and outputs the generated web page to browsing portion 61.

In the case where mobile information device 210, PC 200, or PC 200A is the client, a browsing program is executed in mobile information device 210, PC 200, or PC 200A. For example, in the case where PC 200 is the client, when communication I/F portion 112 receives a web page transmission request from PC 200, application execution portion 63 transmits a web page to PC 200 via communication I/F portion 112. When communication I/F portion 112 receives a CGI command from PC 200, application execution portion 63 carries out the processing corresponding to the CGI command. In the case of carrying out the processing of controlling hardware resources, application execution portion 63 outputs an application command to image generating portion 53. In the case where a command received from PC 200 requests a new web page, application execution portion 63 generates a new web page and transmits the generated web page to PC 200.

Application execution portion 63 will be described below in more detail. Application execution portion 63 includes an operation accepting portion 71, a page generating portion 73, a page outputting portion 77, and a page transmitting portion 79. Operation accepting portion 71 accepts an operation input by an operation user. In the case where the client is browsing portion 61, an operation input by an operation user to operation panel 160 is accepted by browsing portion 61, and a CGI command that browsing portion 61 outputs in response to acceptance of the operation is input to operation accepting portion 71. The CGI command output from browsing portion 61 corresponds to the operation input by the operation user. Therefore, operation accepting portion 71 accepts the CGI command input from browsing portion 61 as the operation input by the operation user. In the case where the client is one of mobile information device 210, PC 200, and PC 200A, a CGI command that communication I/F portion 112 receives from mobile information device 210, PC 200, or PC 200A is input to operation accepting portion 71. The CGI command that communication I/F portion 112 receives from mobile information device 210, PC 200, or PC 200A corresponds to the operation input by the operation user. Therefore, operation accepting portion 71 accepts the CGI command that communication I/F portion 112 receives from mobile information device 210, PC 200, or PC 200A as the operation input by the operation user.

The operations by the operation user include: an operation of designating display of a web page, a data designating operation of designating data as a target of image processing, an execution operation of designating execution of image processing on data, and an image forming operation of designating formation of an image of data. Here, the CGI command corresponding to the operation of designating display of a web page includes operation identification information for identifying the operation and page identification information for identifying the web page. The CGI command corresponding to the data designating operation of designating data as a target of image processing includes operation identification information for identifying the data designating operation and data identification information for identifying the data. The CGI command corresponding to the execution operation of designating execution of image processing on data includes operation identification information for identifying the execution operation, processing identification information for identifying the image processing, and data identification information for identifying the data as a target of image processing. The CGI command corresponding to the image forming operation of designating formation of an image of data includes operation identification information for identifying the image forming operation and data identification information for identifying the data as a target of image forming.

In the case where the CGI command corresponding to the operation of designating display of a web page is input, operation accepting portion 71 outputs the page identification information to page generating portion 73. In the case where the CGI command corresponding to the data designating operation of designating data as a target of image processing is input, operation accepting portion 71 outputs an application command including the data identification information to image generating portion 53. In the case where the CGI command corresponding to the execution operation of designating execution of image processing on data is input, operation accepting portion 71 outputs an application command including the processing identification information to image generating portion 53. In the case where the CGI command corresponding to the image forming operation of designating formation of an image of data is input, operation accepting portion 71 outputs an application command designating formation of an image to image generating portion 53.

Page generating portion 73 receives page identification information from operation accepting portion 71. When page identification information is input from operation accepting portion 71, page generating portion 73 reads a web page specified by the page identification information from HDD 115, and outputs the web page to page outputting portion 77 or page transmitting portion 79. The web page is a page written in a markup language and for displaying information in the form of characters and images. Further, page generating portion 73 generates a web page on the basis of a page generating instruction from image generating portion 53, which will be described later. While page generating portion 73 will be described later in detail, when page generating portion 73 receives a page generating instruction from image generating portion 53, page generating portion 73 outputs the generated web page to page outputting portion 77 or page transmitting portion 79. In the case where browsing portion 61 is the client, page generating portion 73 outputs the web page to page outputting portion 77. In the case where mobile information device 210, PC 200, or PC 200A is the client, page generating portion 73 outputs the web page to page transmitting portion 79. The client is determined on the basis of the source of the command input to operation accepting portion 71.

When page outputting portion 77 receives a web page from page generating portion 73, page outputting portion 77 outputs the web page to browsing portion 61. Browsing portion 61 displays an image of the web page on LCD 165, thereby allowing the operation user to view the image of the web page.

When page transmitting portion 79 receives a web page from page generating portion 73, page transmitting portion 79 transmits the web page, via communication I/F portion 112, to a device as a client which is one of mobile information device 210, PC 200, and PC 200A. When the device as the client (mobile information device 210, PC 200, or PC 200A) receives the web page, it displays an image of the web page on a display included in the device, thereby allowing the operation user to view the image of the web page.

Image generating portion 53 is the function that is carried out by a task for CPU 111 to execute an image processing program. Image generating portion 53 belongs to the MFP process layer in the software architecture shown in FIG. 4. Image generating portion 53 receives an application command from application portion 51, converts the application command into an operation command, and outputs the operating command to operating portion 55. The operating command is a command that has been predetermined between image generating portion 53 and operating portion 55 and that can be interpreted by operating portion 55.

Image generating portion 53 includes a target determining portion 81, an image forming control portion 83, an image processing control portion 85, a history storing portion 87, a comparing portion 89, and a detecting portion 91. Target determining portion 81 receives an application command including data identification information or an application command including processing identification information from application execution portion 63. Target determining portion 81 determines the data to be processed by application execution portion 63. In the case where an application command including data identification information is input from application execution portion 63, target determining portion 81 determines the data specified by the data identification information as a process target. The application command including data identification information is input from application execution portion 63 when a command corresponding to the data designating operation of designating data as a target of image processing is input to operation accepting portion 71. In other words, it is input at the time when an operation user has designated the data. Hereinafter, the data that has been designated by an operation user will be referred to as "designated data". The designated data includes, besides the data stored in HDD 115, data stored in PCs 200, 200A, data stored in mobile information device 210, and data stored in file server 220.

Hereinafter, the data that has been determined as a process target by target determining portion 81 will be referred to as "process target data". In the case where an application command including the data identification information of designated data is input from application execution portion 63, target determining portion 81 outputs a page generating instruction including the data identification information of process target data, to page generating portion 73.

In the case where an application command including processing identification information is input from application execution portion 63, target determining portion 81 outputs a comparison instruction to comparing portion 89. The comparison instruction includes the data identification information of the process target data.

In response to reception of a comparison instruction, comparing portion 89 outputs a detection instruction to detecting portion 91. Detecting portion 91 detects the free space in HDD 115 at the time when the detection instruction was input. The free space in HDD 115 refers to the space available for storing data in HDD 115. In the case where a usable area has been determined in HDD 115 for each user who uses MFP 100, the free space in HDD 115 refers to the space available for storing data within the area determined for the user who has logged in. More specifically, detecting portion 91 outputs an operating command for measuring the free space to operating portion 55, and acquires the free space input from operating portion 55.

Comparing portion 89 compares the data amount of the process target data specified by the data identification information included in the comparison instruction with the free space in HDD 115 detected by detecting portion 91, and outputs the result of comparison to target determining portion 81. It is noted that detecting portion 91 may be configured to constantly detect the free space in HDD 115 and output the detected free space to comparing portion 89. In this case, comparing portion 89 has acquired from detecting portion 91 the free space at the time when the comparison instruction was input. Thus, comparing portion 89 can compare the data amount of the process target data with the free space at the time when the comparison instruction was input. Comparing portion 89 outputs the result of comparison to target determining portion 81.

<When Data can be Stored>

In the case where the comparison result shows that the data amount of process target data is not greater than the free space at the time when an application command including processing identification information has been input from application execution portion 63, target determining portion 81 determines that it is possible to store the process target data into HDD 115. When it is possible to store the process target data into HDD 115 at the time when an application command including processing identification information is input from application execution portion 63, target determining portion 81 outputs an image processing instruction to image processing control portion 85. The image processing instruction includes the data identification information of the process target data and the processing identification information included in the application command.

In response to reception of the image processing instruction, image processing control portion 85 acquires the process target data, and performs the image processing specified by the processing identification information, on the process target data. Then, image processing control portion 85 stores the processed data, obtained by image-processing the process target data, into HDD 115. As a result, processed data 97 is stored in HDD 115. Image processing control portion 85 outputs data identification information for identifying the processed data, to target determining portion 81.

While a dotted arrow is used in the figure to indicate that image processing control portion 85 stores the processed data into HDD 115, HDD 115 is actually controlled by operating portion 55, and the processed data is stored into HDD 115 by operating portion 55. It is noted that the other dotted arrows connected to processed data 97 and history information 99 similarly indicate that the data is stored into HDD 115 or read from HDD 115 by operating portion 55.

When target determining portion 81 receives data identification information from image processing control portion 85, target determining portion 81 determines processed data 97 specified by the data identification information received from image processing control portion 85, as process target data, and outputs a page generating instruction including the data identification information of the process target data (processed data), to page generating portion 73.

<When Data Cannot be Stored>

In the case where the comparison result shows that the data amount of process target data is greater than the free space at the time when an application command including processing identification information has been input from application execution portion 63, target determining portion 81 determines that it is not possible to store the process target data into HDD 115. When it is not possible to store the process target data into HDD 115 at the time when an application command including processing identification information is input from application execution portion 63, target determining portion 81 outputs a history storing instruction to history storing portion 87. The history storing instruction includes the data identification information of the process target data and the processing identification information included in the application command.

In response to reception of the history storing instruction, history storing portion 87 stores history information into HDD 115. As a result, history information 99 is stored in HDD 115. History information 99 is stored in association with process target data. History information 99 includes at least one history record including a sequence number and processing identification information. More specifically, history storing portion 87 determines the sequence numbers in accordance with the order in which a plurality of history storing instructions are input for process target data, and generates each history record including the sequence number and the processing identification information included in the corresponding history storing instruction, and additionally stores the generated records into history information 99 being stored in HDD 115.

When the storing of history information 99 by history storing portion 87 is finished, target determining portion 81 outputs a page generating instruction, including the data identification information of the process target data and history identification information for identifying history information 99, to page generating portion 73.

<When there is More than One Application Command Including Processing Identification Information>

Target determining portion 81 may receive more than one application command including processing identification information from application execution portion 63. In such a case, although the data amount of the process target data may be not greater than the free space at the time when the preceding application command was input, at the time when the succeeding application command is input, the data amount of the process target data may be greater than the free space. For example, there may be a case where the data amount of process target data is not greater than the free space at the time when a first application command is input, the data amount of process target data is still not greater than the free space at the time when a second application command is input, and the data amount of process target data is greater than the free space at the time when a third application command is input.

In this case, target determining portion 81 determines designated data as the process target data before the first application command is input. Thereafter, when the first application command is input, target determining portion 81 outputs an image processing instruction corresponding to the first application command to image processing control portion 85, and then sets processed data 97 that has been stored into HDD 115 by image processing control portion 85, as the process target data. Thereafter, when the second application command is input, target determining portion 81 outputs an image processing instruction corresponding to the second application command, to image processing control portion 85. Then, processed data 97 that had been image-processed in accordance with the image processing instruction corresponding to the first application command is updated with processed data that has been image-processed by image processing control portion 85 in accordance with the image processing instruction corresponding to the second application command. Therefore, target determining portion 81 sets processed data 97 stored in HDD 115, which has been image-processed by image processing control portion 85 in accordance with the image processing instruction corresponding to the second application command, as the process target data. Thereafter, when the third application command is input, target determining portion 81 determines processed data 97 being stored in HDD 115 as the process target data, without causing image processing control portion 85 to perform image processing, and outputs a history storing instruction to history storing portion 87.

When page generating portion 73 receives a page generating instruction from image generating portion 53, page generating portion 73 generates a web page on the basis of the page generating instruction. Prior to the input of the page generating instruction from image generating portion 53, page generating portion 73 has received page identification information from operation accepting portion 71, and has read the web page specified by the page identification information from HDD 115. Page generating portion 73 changes the web page that has already been read, to a web page for displaying an image of the process target data. More specifically, page generating portion 73 adds, to the already read web page, a display command to display an image of the process target data specified by the data identification information included in the page generating instruction received from image generating portion 53. The display command is a command linked to process target data, and it includes the data identification information of the process target data, which may be for example a uniform resource locator (URL). In this manner, page generating portion 73 can generate the web page that displays an image of the process target data. The process target data, which is determined by target determining portion 81 described above, may be designated data or processed data 97. It is noted that a new web page may be read from HDD 115 and the display command may be added to the newly read web page.

Page generating portion 73 includes an image processing command generating portion 75. In the case where the page generating instruction received from image generating portion 53 includes history identification information making a pair with data identification information, image processing command generating portion 75 reads history information 99 specified by the history identification information from HDD 115. Image processing command generating portion 75 then generates an image processing command to perform image processing specified by the processing identification information included in the read history information 99 on the process target data, and adds the generated image processing command to the web page. History information 99 includes at least one history record. When history information 99 includes two or more history records, image processing command generating portion 75 adds a plurality of image processing commands sequentially to the web page, in such a manner that the image processing commands corresponding to the image processing operations specified by the processing identification information items included in the history records are performed sequentially in ascending order of the sequence numbers included in the respective history records. In this manner, page generating portion 73 can generate a web page for performing image processing on the process target data.

At the stage when a web page is displayed, an image of the process target data is displayed by the above-described display command. In the case where the web page includes an image processing command, at the stage when the web page is displayed, the image processing according to the image processing command is performed on the process target data, and an image of the data obtained by image-processing the process target data in accordance with the image processing command is displayed. Therefore, even in the case where the free space in HDD 115 is smaller than the data amount, the web page including the image processing command is generated, so that an image of the process target data after the image processing has been performed thereon can be displayed. This allows the user to confirm on the screen the end result when forming an image of the designated data. Furthermore, in the case where the free space in HDD 115 is not smaller than the data amount, the web page does not include the image processing command but includes the display command for displaying the processed data. Therefore, an image of the processed data obtained by executing the image processing specified by the execution operation input by the operation user is displayed. That is, it is possible to display an image of the processed data based on which an image will be actually formed. This allows the operation user to confirm the end result when forming an image of the designated data, on the screen on which the image of the actually image-processed data is displayed.

In the case where an application command instructing image forming is received from application execution portion 63, target determining portion 81 determines whether history information 99 corresponding to the process target data has been stored in HDD 115. If no history information 99 has been stored, target determining portion 81 outputs an image forming instruction for forming an image of the process target data, to image forming control portion 83. The image forming instruction includes the data identification information of the process target data. In response to reception of the image forming instruction, image forming control portion 83 reads processed data 97 as the process target data from HDD 115, and controls image forming portion 140 to form an image of processed data 97.

In the case where an application command instructing image forming is received from application execution portion 63 and history information 99 corresponding to the process target data has been stored in HDD 115, target determining portion 81 outputs a comparison instruction to comparing portion 89. The comparison instruction includes the data identification information of the process target data. In the case where the result of comparison by comparing portion 89 shows that the data amount of the process target data is greater than the free space, target determining portion 81 outputs the comparison instruction to comparing portion 89 at regular intervals until the result of comparison shows that the data amount of the process target data is not greater than the free space. In the case where the result of comparison by comparing portion 89 shows that the data amount of the process target data is not greater than the free space, target determining portion 81 outputs a history-referencing image processing instruction to image processing control portion 85. The history-referencing image processing instruction includes the data identification information of the process target data and the history identification information.

In response to reception of the history-referencing image processing instruction, image processing control portion 85 acquires the process target data, and also reads history information 99 specified by the history identification information from HDD 115. Then, image processing control portion 85 performs the image processing specified by the processing identification information included in history information 99, on the process target data. History information 99 may include two or more history records. In such a case, image processing control portion 85 performs a plurality of image processing operations on the process target data sequentially from the one that is specified by the processing identification information included in the history record with the smallest sequence number. Image processing control portion 85 then stores the processed data, obtained by image-processing the process target data, into HDD 115. As a result, processed data 97 is stored in HDD 115. Image processing control portion 85 outputs data identification information for identifying the processed data, to target determining portion 81.

When the image processing by image processing control portion 85 is finished and the data identification information is received from image processing control portion 85, target determining portion 81 determines the processed data 97 specified by the input data identification information as the process target data, and outputs an image forming instruction to form an image of the process target data, to image forming control portion 83. The image forming instruction includes the data identification information of the process target data (processed data 97). When image forming control portion 83 receives the image forming instruction, image forming control portion 83 reads processed data 97 as the process target data from HDD 115, and controls image forming portion 140 to form an image of processed data 97. Therefore, even when the free space in HDD 115 is smaller than the data amount at the stage when the operation user inputs an image forming operation, once the free space in HDD 115 becomes equal to or greater than the data amount, an image of the data that has undergone the image processing specified by the execution operation input by the operation user is formed. This ensures that the image processing is performed in accordance with the execution operation input by the user, preventing the execution operation input by the user from being wasted.

The operation of MFP 100 in the case where an operation user operates operation panel 160 will now be described by using a screen displayed on operation panel 160. It is assumed that a print setup program defines processing of designating process target data, processing of previewing the designated data, and processing of forming an image of the process target data.

FIG. 6 shows an example of a data designating screen. The data designating screen is a screen displayed first when the print setup program is executed. As CPU 111 executes the print setup program, application execution portion 63 is formed in CPU 111. Page generating portion 73 in application execution portion 63 reads a web page corresponding to the data designating screen from HDD 115, and the web page is output from page outputting portion 77 to browsing portion 61. Browsing portion 61 then displays the data designating screen, which is an image of the web page, on LCD 165.

Referring to FIG. 6, a data designating screen 300 displays file names of five data items respectively in a selectable manner. The data having the file names selectably displayed on data designating screen 300 may be data predetermined for the operation user, data stored in an area predetermined for the operation user among a plurality of storing areas included in HDD 115, or data stored in an area designated by the operation user. Further, the data having the file names selectably displayed on data designating screen 300 may be data stored in file server 220, data stored in another computer, which is for example MFP 100A, 100B, PC 200, 200A, or mobile information device 210, besides the data stored in HDD 115.

Data designating screen 300 includes a button having the characters "select" displayed thereon, and a button having the characters "print without modification" displayed thereon, for a respective one of the five file names. When an operation user designates a "select" button, browsing portion 61 accepts a data designating operation of designating the data having the file name corresponding to that button, and outputs a command including the operation identification information for identifying the data designating operation and the data identification information of the data having the file name, to application execution portion 63. The data identification information is a URL indicating the position where the data having the file name is stored. Further, each "select" button is linked with the page identification information (URL) of the web page including a preview screen, and when the operation user designates a "select" button, browsing portion 61 accepts an operation of designating display of the web page corresponding to that button, and outputs the page identification information of the web page including the preview screen, to page generating portion 73.

It is here assumed that the "select" button corresponding to the file name "document1.jpg" has been designated by the operation user. In this case, browsing portion 61 outputs a command including operation identification information for identifying the data designating operation of designating data, and data identification information (URL) for identifying the data with the file name "document1.jpg", to application execution portion 63. The data with the file name "document1.jpg" is the designated data.

When the command including the operation identification information for identifying the data designating operation and the data identification information (URL) of the data with the file name "document1.jpg" is input, operation accepting portion 71 in application execution portion 63 outputs an application command including the data identification information to image generating portion 53. When the command including the data identification information (URL) of the data with the file name "document1.jpg" is input, target determining portion 81 in image generating portion 53 determines the designated data specified by the data identification information as the process target data, and outputs a page generating instruction including the data identification information of the process target data, to page generating portion 73. The process target data at this stage is the designated data.

When page generating portion 73 receives page identification information of a web page including a preview screen from operation accepting portion 71, page generating portion 73 reads the web page specified by the page identification information from HDD 115. Then, when a page generating instruction is received from target determining portion 81, page generating portion 73 adds, to the already read web page, a display command to display an image of the process target data specified by the data identification information included in the page generating instruction, which is here the designated data with the file name "document1.jpg". The display command is a command linked to the process target data. Here, the display command includes the URL of the designated data with the file name "document1.jpg". Page generating portion 73 outputs the web page added with the display command to page outputting portion 77. Page outputting portion 77 outputs the web page received from page generating portion 73 to browsing portion 61. Browsing portion 61 then displays an image of the web page, which is here the preview screen, on LCD 165.

FIG. 7 shows an example of a preview screen. Referring to FIG. 7, a preview screen 310 includes an area 311 for displaying an image, areas 313, 315 each including a plurality of buttons for designating image processing, and a button 317 for instructing image forming. In area 311, the image of the designated data with the file name "document1.jpg" is displayed, which allows the user to confirm the end result in the case where an image of the designated data with the file name "document1.jpg" will be formed on a sheet of paper.

Area 313 includes a button having "90 degrees to the left" displayed thereon and a button having "90 degrees to the right" displayed thereon. The button with "90 degrees to the left" displayed thereon is a button for designating the image processing of rotating an image 90 degrees counterclockwise, and is associated with a command to designate the image processing of rotating an image 90 degrees counterclockwise. The button with "90 degrees to the right" displayed thereon is a button for designating the image processing of rotating an image 90 degrees clockwise, and is associated with a command to designate the image processing of rotating an image 90 degrees clockwise.

Area 315 includes four buttons with the characters "150%", "120%", "80%", and "50%" displayed respectively thereon, as the buttons for designating the image processing of scaling an image. The button with "150%" displayed thereon is a button for designating the image processing of enlarging an image to 150% of its original size, and is associated with a command to designate the image processing of enlarging an image to 150% of its original size. The button with "120%" displayed thereon is a button for designating the image processing of enlarging an image to 120% of its original size, and is associated with a command to designate the image processing of enlarging an image to 120% of its original size. The button with "80%" displayed thereon is a button for designating the image processing of reducing an image to 80% of its original size, and is associated with a command to designate the image processing of reducing an image to 80% of its original size. The button with "50%" displayed thereon is a button for designating the image processing of reducing an image to 50% of its original size, and is associated with a command to designate the image processing of reducing an image to 50% of its original size.

When an operation user designates a button included in either area 313 or 315, browsing portion 61 accepts an execution operation of designating the execution of the image processing corresponding to that button, and outputs a CGI command including the operation identification information for identifying the execution operation and the processing identification information for identifying the image processing, to application execution portion 63.

It is here assumed that the operation user has firstly designated the button with "90 degrees to the right" displayed thereon, secondly designated the button with "80%" displayed thereon, and lastly designated button 317 for instructing image forming. In this case, at the time when the button with "90 degrees to the right" displayed thereon has been designated, browsing portion 61 outputs a CGI command including the processing identification information for identifying the image processing of rotating an image 90 degrees clockwise to application execution portion 63. Next, at the time when the button with "80%" displayed thereon has been designated, browsing portion 61 outputs a CGI command including the processing identification information for identifying the image processing of reducing the image to 80% of its original size to application execution portion 63. Thereafter, when button 317 for instructing image forming has been designated, browsing portion 61 outputs a CGI command including the operation identification information for identifying the image forming operation of designating formation of an image of the data and the data identification information for identifying the data the image of which is to be formed, to application execution portion 63.

When the CGI command including the processing identification information for identifying the image processing of rotating an image 90 degrees clockwise is input, operation accepting portion 71 in application execution portion 63 outputs an application command including the processing identification information for identifying the image processing of rotating an image 90 degrees clockwise to image generating portion 53. When the application command including the processing identification information for identifying the image processing of rotating an image 90 degrees clockwise is input, target determining portion 81 in image generating portion 53 outputs a comparison instruction including the data identification information of the process target data (designated data) to comparing portion 89. Comparing portion 89 compares the data amount of the process target data (designated data) with the free space in HDD 115, and outputs the result of comparison to target determining portion 81.

<1: When Designated Data can be Stored>

In the case where the process target data (designated data) can be stored into HDD 115 at the time when the application command including the processing identification information for identifying the image processing of rotating an image 90 degrees clockwise has been input, target determining portion 81 outputs an image processing instruction including the processing identification information for identifying the image processing of rotating an image 90 degrees clockwise, to image processing control portion 85. It is determined that the process target data (designated data) can be stored into HDD 115 when the comparison result shows that the data amount of the process target data (designated data) is not greater than the free space. When image processing control portion 85 receives the image processing instruction, image processing control portion 85 acquires the process target data (designated data), and performs the image processing of rotating an image 90 degrees clockwise on the process target data. Image processing control portion 85 then stores, into HDD 115, processed data 97 that has been obtained by executing the image processing of rotating the image 90 degrees clockwise on the process target data (designated data), and outputs data identification information of that processed data 97 to target determining portion 81.

When target determining portion 81 receives the data identification information of processed data 97 from image processing control portion 85, target determining portion 81 determines processed data 97 specified by the data identification information as the process target data, and outputs a page generating instruction including the data identification information of the process target data (processed data 97) to page generating portion 73.

Page generating portion 73 changes the web page that has been read, which is here the web page including preview screen 310, to a web page for displaying an image of the process target data. More specifically, page generating portion 73 adds a display command to display an image of the process target data (processed data 97) specified by the data identification information included in the page generating instruction input from image generating portion 53, to the web page including preview screen 310. The web page generated by page generating portion 73 is displayed on LCD 165 by browsing portion 61. At this stage, area 311 in preview screen 310 displayed on LCD 165 includes the image of the designated data that has been rotated by 90 degrees clockwise.

Next, when the CGI command including the processing identification information for identifying the image processing of reducing an image to 80% of its original size is input, operation accepting portion 71 in application execution portion 63 outputs an application command including the processing identification information of the image processing of reducing an image to 80% of its original size, to image generating portion 53. When the application command including the processing identification information of the image processing of reducing an image to 80% of its original size is input, target determining portion 81 in image generating portion 53 outputs a comparison instruction including the data identification information of the process target data (processed data 97) to comparing portion 89. Comparing portion 89 compares the data amount of the process target data (processed data 97) with the free space in HDD 115, and outputs the result of comparison to target determining portion 81.

<1-1: When Processed Data can be Stored>

In the case where it is possible to store the process target data (processed data 97) into HDD 115 at the time when the application command including the processing identification information for identifying the image processing of reducing an image to 80% of its original size has been input from operation accepting portion 71 in application execution portion 63, target determining portion 81 outputs an image processing instruction including the processing identification information for identifying the image processing of reducing an image to 80% of its original size, to image processing control portion 85. It is determined that the process target data (processed data 97) can be stored into HDD 115 when the comparison result shows that the data amount of the process target data (processed data 97) is not greater than the free space. In response to reception of the image processing instruction, image processing control portion 85 acquires the process target data (processed data 97), and performs the image processing of reducing an image to 80% of its original size on the process target data. Image processing control portion 85 then updates the processed data 97 being stored in HDD 115 with the data obtained by executing the image processing of reducing the image to 80% of its original size on the process target data (processed data 97), and outputs data identification information of the processed data 97 to target determining portion 81. At this stage, processed data 97 stored in HDD 115 is the data obtained by executing the image processing of rotating the image 90 degrees clockwise and then executing the image processing of reducing the image to 80% of its original size, on the designated data. As this processed data 97 is displayed, the data the image of which is to be formed as will be described below is displayed as it is, enabling the end result to be displayed with accuracy.

When target determining portion 81 receives the data identification information from image processing control portion 85, target determining portion 81 determines processed data 97 specified by the data identification information as the process target data, and outputs a page generating instruction including the data identification information of the process target data (processed data 97) to page generating portion 73.

Page generating portion 73 changes the web page already read, which is here the web page including preview screen 310, to a web page for displaying an image of the process target data. More specifically, page generating portion 73 adds a display command to display an image of the process target data (processed data 97) specified by the data identification information included in the page generating instruction input from image generating portion 53, to the web page including preview screen 310. The web page generated by page generating portion 73 is displayed on LCD 165 by browsing portion 61. At this stage, area 311 in preview screen 310 displayed on LCD 165 includes the image of the designated data that has been rotated by 90 degrees clockwise and further reduced to 80% of its original size.

Lastly, when the CGI command including the operation identification information for identifying the image forming operation of designating formation of an image of data and the data identification information for identifying the data the image of which is to be formed is input, operation accepting portion 71 in application execution portion 63 outputs an application command instructing image forming, to image generating portion 53.

When the application command instructing image forming is input from application execution portion 63, target determining portion 81 in image generating portion 53 determines whether history information 99 corresponding to the process target data has been stored in HDD 115. Here, no history information 99 has been stored, and therefore, target determining portion 81 outputs an image forming instruction to form an image of the process target data (processed data 97) to image forming control portion 83. As a result, an image of processed data 97, which is the process target data, is formed on a sheet of paper by image forming portion 140. Processed data 97 is the one obtained by performing the image processing of rotating the image 90 degrees clockwise and the image processing of reducing the image to 80% of its original size on the designated data. Accordingly, the same image as the image displayed on preview screen 310 is formed.

<1-2: When Processed Data Cannot be Stored>

In the case where it is not possible to store the process target data (processed data 97) into HDD 115 at the time when the application command including the processing identification information for identifying the image processing of reducing an image to 80% of its original size has been input from operation accepting portion 71 in application execution portion 63, target determining portion 81 outputs a history storing instruction including the data identification information of the process target data (processed data 97) and the processing identification information for identifying the image processing of reducing an image to 80% of its original size, to history storing portion 87. It is determined that the process target data (processed data 97) cannot be stored into HDD 115 when the comparison result shows that the data amount of the process target data (processed data 97) is greater than the free space. History storing portion 87 generates a history record including a sequence number indicating that it is the first and the processing identification information for identifying the image processing of reducing an image to 80% of its original size, and stores the generated record as history information 99 into HDD 115 in association with the process target data (processed data 97). When the storing of history information 99 by history storing portion 87 is finished, target determining portion 81 generates a page generating instruction including a set of the data identification information of the process target data (processed data 97) and the history identification information of history information 99, to page generating portion 73.

Page generating portion 73 changes the web page already read, which is here the web page including preview screen 310, to a web page for displaying an image of the process target data. More specifically, page generating portion 73 adds a display command to display an image of the process target data (processed data 97) specified by the data identification information included in the page generating instruction input from image generating portion 53, to the web page including preview screen 310. Further, image processing command generating portion 75 in page generating portion 73 reads history information 99 specified by the history identification information included in the page generating instruction from HDD 115, and generates an image processing command to perform the image processing specified by the processing identification information included in history information 99, which is here the image processing of reducing an image to 80% of its original size, on the process target data, and then adds the generated image processing command to the web page.

The web page generated by page generating portion 73 is displayed on LCD 165 by browsing portion 61. The web page including the preview screen input from browsing portion 61 includes the display command to display an image of the process target data (processed data 97), and the image processing command to perform the image processing of reducing an image to 80% of its original size on the process target data (processed data 97). At this stage, processed data 97 is the data obtained by rotating the image of the designated data by 90 degrees clockwise. Browsing portion 61 executes the image processing command to reduce the image of processed data 97 to 80% of its original size. Accordingly, area 311 in preview screen 310 displayed on LCD 165 includes the image of the designated data rotated by 90 degrees clockwise and, further, reduced to 80% of its original size.

Lastly, when the CGI command including the operation identification information for identifying the image forming operation of designating formation of an image of data and the data identification information for identifying the data the image of which is to be formed is input, operation accepting portion 71 in application execution portion 63 outputs an application command instructing image forming, to image generating portion 53.

When the application command instructing image forming is input from application execution portion 63, target determining portion 81 in image generating portion 53 determines whether history information 99 corresponding to the process target data has been stored in HDD 115. Here, history information 99 has been stored, and therefore, target determining portion 81 waits until the data amount of the process target data (processed data 97) becomes not greater than the free space, and once the data amount of the process target data (processed data 97) has become not greater than the free space, target determining portion 81 outputs a history-referencing image processing instruction including the data identification information of the process target data (processed data 97) and the history identification information, to image processing control portion 85.

In response to reception of the history-referencing image processing instruction, image processing control portion 85 reads the process target data (processed data 97) from HDD 115, and also reads history information 99 from HDD 115. Then, image processing control portion 85 carries out the image processing specified by the processing identification information included in history information 99, which is here the image processing of reducing an image to 80% of its original size, on the process target data (processed data 97). Image processing control portion 85 then updates the processed data 97 being stored in HDD 115 with the processed data obtained by performing the image processing on the process target data (processed data 97). As a result, processed data 97 is stored in HDD 115. Image processing control portion 85 outputs the data identification information for identifying the processed data 97, to target determining portion 81.

When the image processing by image processing control portion 85 is finished and the data identification information of processed data 97 is received from image processing control portion 85, target determining portion 81 determines processed data 97 specified by the received data identification information as the process target data, and outputs an image forming instruction to form an image of the process target data to image forming control portion 83. This causes image forming portion 140 to form an image of processed data 97 as the process target data on a sheet of paper.

<2: When Designated Data Cannot be Stored>

In the case where it is not possible to store the process target data (designated data) into HDD 115 at the time when the application command including the processing identification information for identifying the image processing of rotating an image 90 degrees clockwise has been input, target determining portion 81 outputs a history storing instruction including the data identification information of the process target data (designated data) and the processing identification information for identifying the image processing of rotating an image 90 degrees clockwise, to history storing portion 87. It is determined that the process target data (designated data) cannot be stored into HDD 115 when the comparison result shows that the data amount of the process target data (designated data) is greater than the free space. History storing portion 87 generates a history record including a sequence number indicating that it is the first and the processing identification information for identifying the image processing of rotating an image 90 degrees clockwise, and stores into HDD 115 the generated record as history information 99 in association with the process target data (designated data). When the storing of history information 99 by history storing portion 87 is finished, target determining portion 81 generates a page generating instruction including a set of the data identification information of the process target data (designated data) and the history identification information of history information 99, to page generating portion 73.

Page generating portion 73 changes the web page already read, which is here the web page including preview screen 310, to a web page for displaying an image of the process target data. More specifically, page generating portion 73 adds a display command to display an image of the process target data (designated data) specified by the data identification information included in the page generating instruction input from image generating portion 53, to the web page including preview screen 310. Further, image processing command generating portion 75 in page generating portion 73 reads history information 99 specified by the history identification information included in the page generating instruction from HDD 115, and generates an image processing command to carry out the image processing specified by the processing identification information included in history information 99, which is here the image processing of rotating an image 90 degrees clockwise, on the process target data (designated data), and then adds the generated image processing command to the web page.

The web page generated by page generating portion 73 is displayed on LCD 165 by browsing portion 61. The web page including preview screen 310 being input to browsing portion 61 includes the display command to display an image of the process target data (designated data), and the image processing command to carry out the image processing of rotating an image 90 degrees clockwise. As browsing portion 61 executes the image processing command to rotate the image of the designated data by 90 degrees clockwise, area 311 in preview screen 310 displayed on LCD 165 includes the image of the designated data rotated by 90 degrees clockwise.

Next, when a command including the processing identification information for identifying the image processing of reducing an image to 80% of its original size is input, operation accepting portion 71 in application execution portion 63 outputs an application command including the processing identification information of the image processing of reducing an image to 80% of its original size, to image generating portion 53. When the application command including the processing identification information of the image processing of reducing an image to 80% of its original size is input, target determining portion 81 in image generating portion 53 outputs a comparison instruction including the data identification information of the process target data (designated data) to comparing portion 89. Comparing portion 89 compares the data amount of the process target data (designated data) with the free space in HDD 115, and outputs the result of comparison to target determining portion 81.

In the case where the comparison result which is received after target determining portion 81 has output the comparison instruction including the data identification information of the process target data (designated data) to comparing portion 89 shows that the data amount of the process target data (designated data) is greater than the free space, target determining portion 81 outputs a history storing instruction including the data identification information of the process target data (designated data) and the processing identification information of the image processing of reducing an image to 80% of its original size, to history storing portion 87. History storing portion 87 refers to history information 99 that is stored in association with the process target data (designated data), and generates a history record including a sequence number indicating that it is the second and the processing identification information of the image processing of reducing an image to 80% of its original size, and adds the generated history record to history information 99. When the storing of history information 99 by history storing portion 87 is finished, target determining portion 81 outputs a page generating instruction, including a set of the data identification information of the process target data (designated data) and the history identification information of history information 99, to page generating portion 73.

Page generating portion 73 changes the web page already read, which is here the web page including preview screen 310, to a web page for displaying an image of the process target data. More specifically, page generating portion 73 adds a display command to display an image of the process target data (designated data) specified by the data identification information included in the page generating instruction input from image generating portion 53, to the web page including preview screen 310. Further, image processing command generating portion 75 in page generating portion 73 reads history information 99 specified by the history identification information included in the page generating instruction from HDD 115, and generates an image processing command to carry out the image processing specified by the processing identification information included in history information 99 on the process target data, and then adds the generated image processing command to the web page. At this stage, history information 99 includes the processing identification information of the image processing of rotating an image 90 degrees clockwise as the first image processing, and the processing identification information of the image processing of reducing an image to 80% of its original size as the second image processing. Accordingly, image processing command generating portion 75 generates a first image processing command to carry out the image processing of rotating an image 90 degrees clockwise on the designated data, and a second image processing command to carry out the image processing of reducing the image to 80% of its original size, and adds the generated commands to the web page such that the first image processing command is executed first and then the second image processing command is executed.

FIG. 8 shows, by way of example, a web page added with a display command, and first and second image processing commands. Referring to FIG. 8, a web page 400 includes an area 401 for designating a file name "document1.jpg" as the data identification information of the process target data, which is here the designated data. Further, an area 402 includes a first image processing command to carry out the image processing of rotating an image 90 degrees clockwise. An area 403 includes a second image processing command to carry out the image processing of reducing an image to 80% of its original size. Further, an area 404 includes a display command to display the process target data.

Returning to FIG. 5, the web page generated by page generating portion 73 is displayed on LCD 165 by browsing portion 61. The web page including preview screen 310 being input to browsing portion 61 includes, as shown by way of example in FIG. 8, area 404 including the display command to display an image of the process target data (designated data), area 402 including the first image processing command to carry out the image processing of rotating an image 90 degrees clockwise, and area 403 including the second image processing command to carry out the image processing of reducing an image to 80% of its original size. At the stage when browsing portion 61 displays the web page, the first image processing command is executed to rotate the image of the designated image 90 degrees clockwise, and further, the second image processing command is executed to reduce the image to 80% of its original size. Accordingly, area 311 in preview screen 310 displayed on LCD 165 includes the image of the designated data that has been rotated by 90 degrees clockwise and, further, reduced to 80% of its original size.

Lastly, in the case where the CGI command including the operation identification information for identifying the image forming operation of designating formation of an image of data and the data identification information for identifying the data the image of which is to be formed is input, operation accepting portion 71 in application execution portion 63 outputs an application command instructing image forming, to image generating portion 53.

When the application command instructing image forming is input from application execution portion 63, target determining portion 81 in image generating portion 53 determines whether history information 99 corresponding to the process target data has been stored in HDD 115. Here, history information 99 has been stored, and therefore, target determining portion 81 waits until the data amount of the process target data (designated data) becomes not greater than the free space, and once the data amount of the process target data (designated data) has become not greater than the free space, target determining portion 81 outputs a history-referencing image processing instruction including the data identification information of the process target data (designated data) and the history identification information, to image processing control portion 85.

In response to reception of the history-referencing image processing instruction, image processing control portion 85 acquires the process target data (designated data), and also reads history information 99 from HDD 115. Then, image processing control portion 85 carries out the image processing specified by the processing identification information included in history information 99, i.e. the first image processing of rotating an image 90 degrees clockwise and the second image processing of reducing the image to 80% of its original size here, on the process target data (designated data). Image processing control portion 85 then stores processed data 97, obtained by executing the first and second image processing on the process target data (designated data), into HDD 115. As a result, processed data 97 is stored in HDD 115. Image processing control portion 85 outputs the data identification information for identifying the processed data 97, to target determining portion 81.

When the image processing by image processing control portion 85 is finished and the data identification information of processed data 97 is input from image processing control portion 85, target determining portion 81 determines processed data 97 specified by the input data identification information as the process target data, and outputs an image forming instruction to form an image of the process target data to image forming control portion 83. This causes image forming portion 140 to form an image of processed data 97 as the process target data on a sheet of paper.

Figure 9:
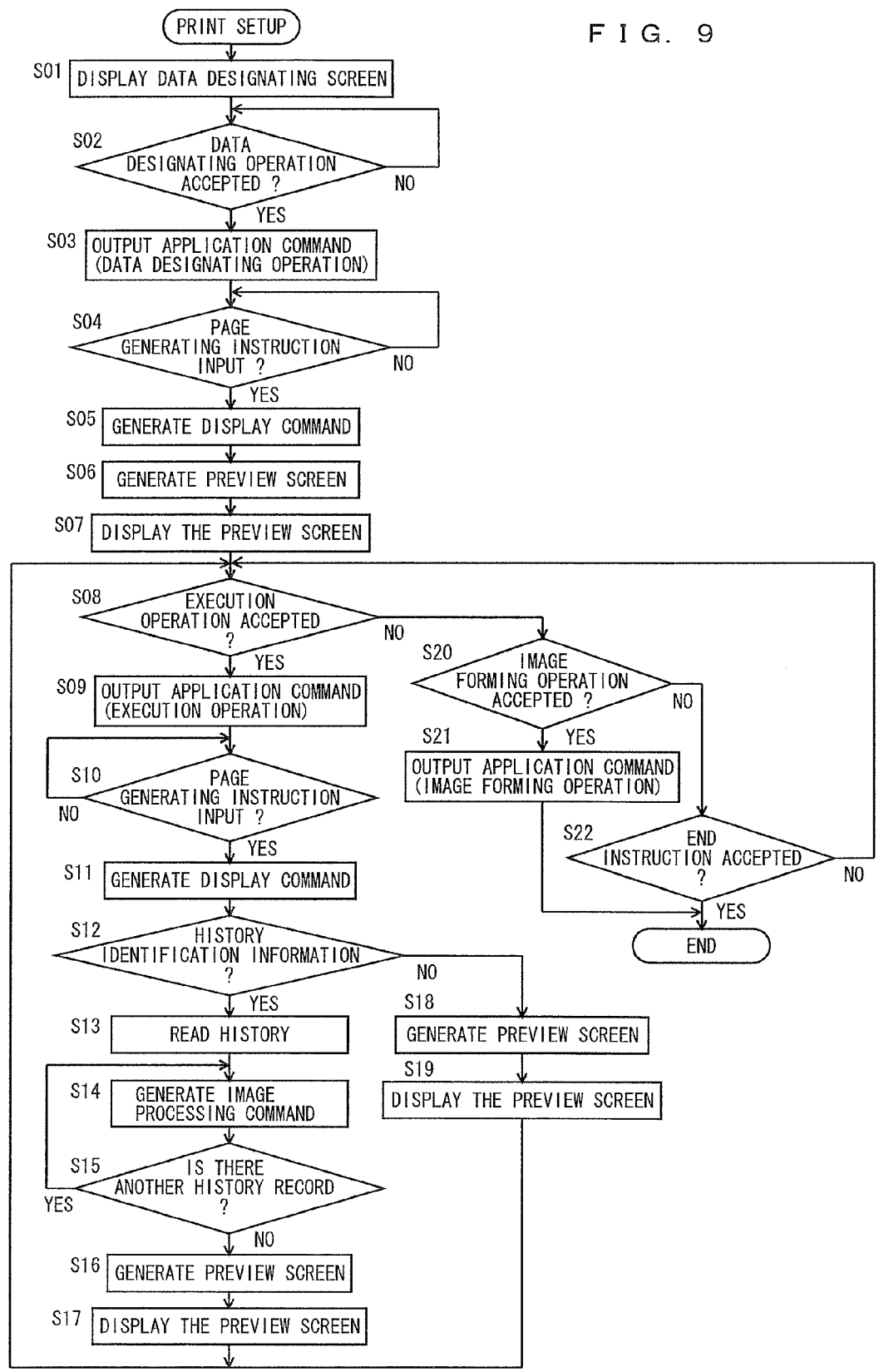
FIG. 9 is a flowchart illustrating an example of the flow of a print setup process.

FIG. 9 is a flowchart illustrating an example of the flow of a print setup process. The print setup process is carried out by CPU 111 as CPU 111 executes a print setup program stored in ROM 113, HDD 115, or CD-ROM 118.

Referring to FIG. 9, CPU 111 displays a data designating screen (step S01). CPU 111 starts a browsing program, and outputs a web page including the data designating screen shown in FIG. 6 to a task of executing the browsing program to cause it to display data designating screen 300. The task of executing the browsing program corresponds to browsing portion 61 in FIG. 5.

In the following step S02, CPU 111 determines whether a data designating operation has been accepted. When the task of executing the browsing program accepts a data designating operation of designating data as a target of image processing, the task of executing the browsing program outputs a CGI command including the data identification information of the designated data. When the CGI command including the data identification information from the task of executing the browsing program is detected, CPU 111 determines that the data designation has been accepted. CPU 111 is in a standby mode until the data designating operation is accepted, and once the data designating operation is accepted, the process proceeds to step S03.

In step S03, CPU 111 outputs an application command indicating that the data designating operation has been accepted, to a task of executing the image processing program. The application command indicating that the data designating operation has been accepted includes the data identification information included in the CGI command that is input from the task of executing the browsing program in step S02. The task of executing the image processing program corresponds to image generating portion 53 in FIG. 5. When the task of executing the image processing program receives the application command indicating that the data designating operation has been accepted, the task of executing the image processing program determines process target data, and outputs a page generating instruction including the data identification information of the process target data.

Therefore, in the following step S04, CPU 111 is in a standby mode until a page generating instruction is input. Once the page generating instruction is input (YES in step S04), the process proceeds to step S05.

In step S05, CPU 111 generates a display command, and the process proceeds to step S06. The display command is a command that includes the data identification information included in the page generating instruction and that instructs display of the designated data specified by the data identification information.

In the following step S06, CPU 111 generates a preview screen, and the process proceeds to step S07. Specifically, CPU 111 generates a web page including preview screen 310 shown in FIG. 7. This web page including preview screen 310 includes the display command generated in step S05. Therefore, preview screen 310 includes area 311 for displaying the image of the designated data. In step S07, CPU 111 displays preview screen 310. Specifically, CPU 111 outputs the web page generated in step S06 to the task of executing the browsing program, to cause it to display preview screen 310.

In the following step S08, CPU 111 determines whether an execution operation has been accepted. When the task of executing the browsing program accepts an execution operation of designating execution of image processing, the task of executing the browsing program outputs a CGI command including the processing identification information of the image processing. When the CGI command including the processing identification information is input from the task of executing the browsing program, CPU 111 determines that the execution operation has been accepted. If the execution operation has been accepted, the process proceeds to step S09; otherwise, the process proceeds to step S20.

In step S09, CPU 111 outputs an application command indicating that the execution operation has been accepted, to the task of executing the image processing program. The application command indicating that the execution operation has been accepted includes the processing identification information that is included in the CGI command input from the task of executing the browsing program in step S08. When the task of executing the image processing program receives the application command indicating that the execution operation has been accepted, the task of executing the image processing program determines the process target data, carries out the image processing as required, and outputs a page generating instruction. The page generating instruction includes the data identification information of the process target data. Further, the page generating instruction may or may not include history identification information.

Therefore, in the following step S10, CPU 111 is in a standby mode until a page generating instruction is input, and once the page generating instruction is input (YES in step S10), the process proceeds to step S11.

In step S11, CPU 111 generates a display command, and the process proceeds to step S12. The display command is a command that includes the data identification information included in the page generating instruction and that instructs display of the data specified by the data identification information. The data identification information included in the page generating instruction is the data identification information of the process target data. The process target data is determined by the task of executing the image processing program. Therefore, the display command generated in step S05 and the display command generated in step S11 may include the data identification information of different process target data.

In step S12, CPU 111 determines whether the page generating instruction input in step S10 includes history identification information. If so, the process proceeds to step S13; otherwise, the process proceeds to step S18.

In step S13, CPU 111 reads history information 99 specified by the history identification information from HDD 115. In the following step S14, CPU 111 generates an image processing command. Specifically, CPU 111 selects one of the one or more history records included in history information 99 that has the smallest sequence number, and generates an image processing command to carry out the image processing that is specified by the processing identification information included in the selected history record.

In the following step S15, CPU 111 determines whether there is a history record yet to be selected as a process target. If there is any history record not yet selected as a process target, the process returns to step S14; otherwise, the process proceeds to step S16.

In step S16, CPU 111 generates a preview screen, and the process proceeds to step S17. Specifically, CPU 111 generates a web page including preview screen 310 shown in FIG. 7. This web page including preview screen 310 includes the display command generated in step S11 and at least one image processing command generated in step S14. Therefore, preview screen 310 includes area 311 in which an image obtained by image-processing the image of the designated data is displayed. In step S17, CPU 111 displays the preview screen. Specifically, CPU 111 outputs the web page generated in step S16 to the task of executing the browsing program, to cause it to display preview screen 310. More specifically, the task of executing the browsing program acquires the process target data, and performs image processing on the image of the process target data. The task of executing the browsing program then displays a preview screen that includes, in area 311, the image obtained by processing the image of the process target data.

On the other hand, in step S18, CPU 111 generates a preview screen, and the process proceeds to step S19. Specifically, CPU 111 generates a web page including preview screen 310 shown in FIG. 7. This web page including preview screen 310 includes the display command generated in step S11. The process proceeds to step S18 when the process target data specified by the data identification information included in the display command is processed data 97 that has been image-processed by the task of executing the image processing program. Therefore, preview screen 310 includes area 311 in which the image of processed data 97 is displayed. In step S19, CPU 111 displays the preview screen. Specifically, CPU 111 outputs the web page generated in step S18 to the task of executing the browsing program to cause it to display preview screen 310. More specifically, the task of executing the browsing program reads processed data 97 being stored in HDD 115, and displays the preview screen including the image of that processed data 97 in area 311.

On the other hand, in step S20, CPU 111 determines whether an image forming operation has been accepted. When the task of executing the browsing program accepts an image forming operation instructing formation of an image of data, the task of executing the browsing program outputs a command including the operation identification information for identifying the image forming operation of instructing formation of an image of data and the data identification information for identifying the data the image of which is to be formed. When the command including the operation identification information of the image forming operation and the data identification information is input from the task of executing the browsing program, CPU 111 determines that the image forming operation has been accepted. If the image forming operation has been accepted, the process proceeds to step S21; otherwise, the process proceeds to step S22.

In step S21, CPU 111 outputs an application command instructing image forming, to the task of executing the image processing program, and the process is terminated. The application command instructing image forming includes the data identification information that is included in the CGI command input from the task of executing the browsing program in step S20. The processing in the case where the task of executing the image processing program receives an application command instructing image forming will be described later.

In step S22, CPU 111 determines whether an end instruction has been accepted. When the task of executing the browsing program detects an operation of designating the end of the print setup process, the end instruction is accepted. Otherwise, the process returns to step S08. The operation of designating the end of the print setup process is, for example, an operation of closing the preview screen. When the operation of closing the preview screen is detected by the task of executing the browsing program, the operation is detected as the operation of designating the end of the print setup process.

Figure 10:
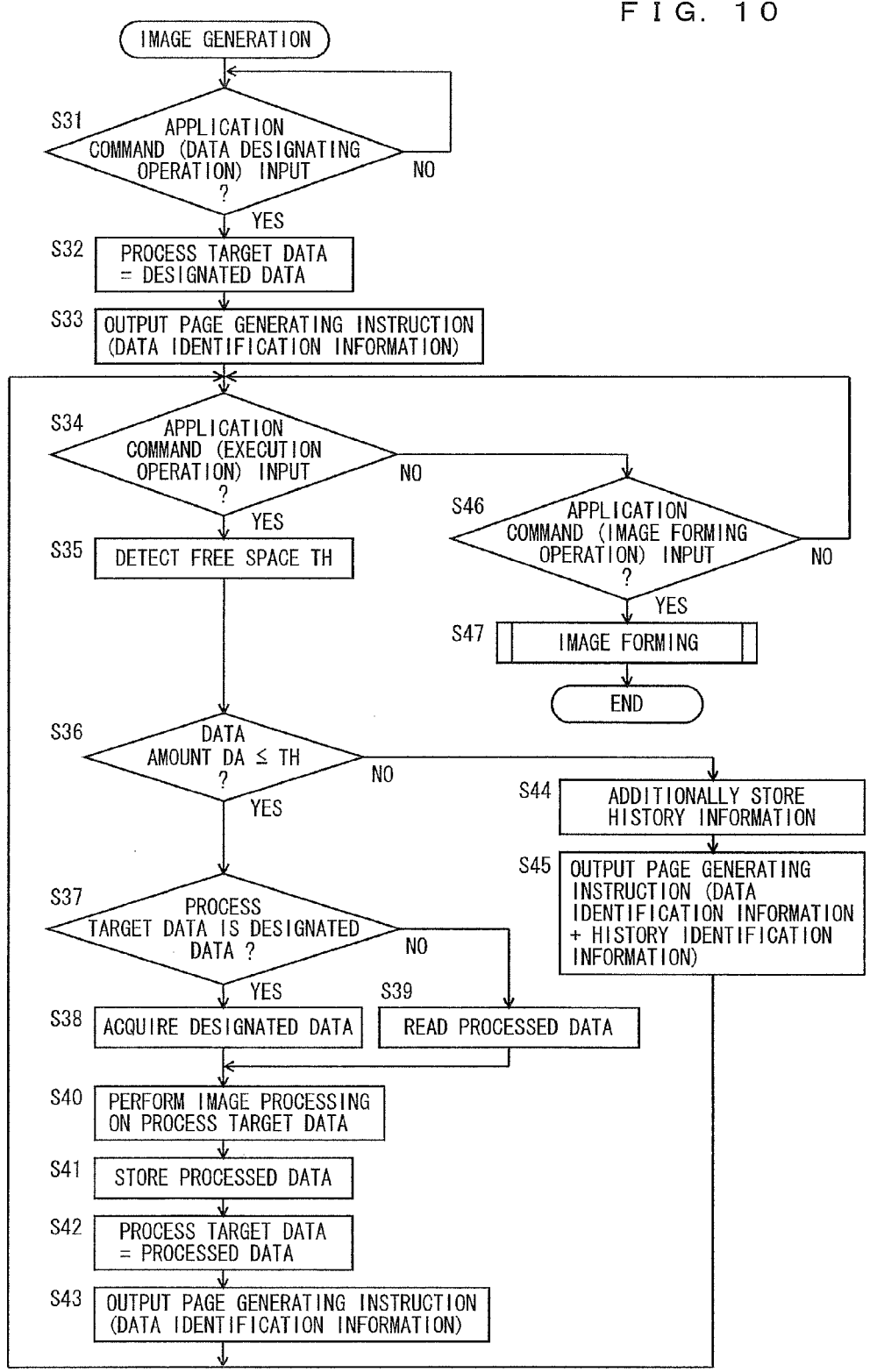
FIG. 10 is a flowchart illustrating an example of the flow of an image generating process.

FIG. 10 is a flowchart illustrating an example of the flow of an image generating process. The image generating process is carried out by CPU 111 as CPU 111 executes an image processing program stored in ROM 113, HDD 115, or CD-ROM 118.

Referring to FIG. 10, CPU 111 determines whether an application command indicating that a data designating operation has been accepted has been input from the task of executing the print setup program (step S31). CPU 111 is in a standby mode until such an application command is input (NO in step S31), and once the application command is input (YES in step S31), the process proceeds to step S32.

In step S32, CPU 111 sets the designated data specified by the data identification information included in the application command as the process target data, and the process proceeds to step S33. In step S33, CPU 111 outputs a page generating instruction to the task of executing the print setup program. The page generating instruction includes the data identification information of the process target data, which is the designated data at this stage.

In the following step S34, CPU 111 determines whether an application command indicating that an execution operation has been accepted has been input from the task of executing the print setup program. If such an application command is input, the process proceeds to step S35; otherwise, the process proceeds to step S46. In step S46, CPU 111 determines whether an application command indicating that an image forming operation has been accepted has been input from the task of executing the print setup program. If such an application command is input, the process proceeds to step S47; otherwise, the process returns to step S34. In step S47, CPU 111 carries out the image forming process, and the process is terminated. The image forming process will be described later in detail.

In step S35, CPU 111 detects the free space TH in HDD 115. CPU 111 then compares the data amount DA of the process target data with the free space TH (step S36). If the data amount DA is not greater than the free space TH, the process proceeds to step S37. If the data amount DA is greater than the free space TH, the process proceeds to step S44.

In step S37, CPU 111 determines whether the process target data is the designated data. If so, the process proceeds to step S38; otherwise, the process proceeds to step S39. In step S38, CPU 111 acquires the designated data as the process target data, and the process proceeds to step S40. When the designated data is stored in HDD 115, the designated data is read from HDD 115. When the designated data is stored in one of file server 220, MFP 100A, MFP 100B, PC 200, PC 200A, and mobile information device 210, the designated data is downloaded from the device that stores the designated data. On the other hand, in step S39, CPU 111 reads processed data 97 as the process target data from HDD 115, and the process proceeds to step S40. Processed data 97 is stored into HDD 115 or updated at the stage when step S41, which will be described later, is executed.

In step S40, CPU 111 carries out the image processing on the process target data. The content of the image processing is determined according to the processing identification information that is included in the application command input in step S34. In the case where the process target data is the designated data, CPU 111 performs the image processing on the designated data. The data obtained by performing the image processing on the designated data is the processed data. In the case where the process target data is the processed data, CPU 111 further performs the image processing on the processed data.

In step S41, CPU 111 stores the processed data into HDD 115, and the process proceeds to step S42. In the case where processed data 97 has been stored in HDD 115, the processed data 97 stored in HDD 115 is updated with the processed data obtained by executing the image processing in step S40.

In step S42, CPU 111 sets processed data 97 that was stored into HDD 115 in step S41 as the process target data, and the process proceeds to step S43. In step S43, CPU 111 outputs a page generating instruction to the task of executing the print setup program, and the process returns to step S34. The page generating instruction includes the data identification information of the process target data, which is the processed data at this stage.

The process proceeds to step S44 in the case where the data amount DA of the process target data is greater than the free space TH. This is the state where the processed data cannot be stored into HDD 115. Therefore, in step S44, CPU 111 stores history information into HDD 115. The history information includes the processing identification information that is included in the application command input in step S34. More specifically, CPU 111 generates a history record including a sequence number and the processing identification information, and stores the history record as the history information into HDD 115. There is a case where history information 99 has already been stored in HDD 115. In such a case, CPU 111 generates a history record by setting the last sequence number thereto, and additionally stores the generated history record as history information 99.

In the following step S45, CPU 111 outputs a page generating instruction to the task of executing the print setup program, and the process returns to step S34. The page generating instruction includes the data identification information of the process target data, which is the processed data at this stage, and the history identification information for identifying history information 99 that was stored in HDD 115 in step S44.

FIG. 11 is a flowchart illustrating an example of the flow of the image forming process. The image forming process is carried out in step S47 in FIG. 10. Referring to FIG. 11, in step S51, CPU 111 detects the free space TH in HDD 115. CPU 111 then compares the data amount DA of the process target data with the free space TH (step S52). If the data amount DA is greater than the free space TH, CPU 111 enters a standby mode until the data amount DA becomes not greater than the free space TH (NO in step S52). If the data amount DA is not greater than the free space TH, the process proceeds to step S53.

In step S53, CPU 111 acquires the process target data. When the process target data is the designated data, CPU 111 acquires the designated data. When the process target data is not the designated data, CPU 111 reads processed data 97 being stored in HDD 115. In the case of acquiring the designated data, when the designated data is stored in HDD 115, CPU 111 reads the designated data from HDD 115. When the designated data is stored in one of file server 220, MFP 100A, MFP 100B, PC 200, PC 200A, and mobile information device 210, CPU 111 downloads the designated data from the device that stores the designated data.

In step S54, CPU 111 determines whether history information 99 corresponding to the process target data has been stored in HDD 115. If so, the process proceeds to step S55; otherwise, the process proceeds to step S60.

In step S55, CPU 111 reads history information 99 from HDD 115. In the following step S56, CPU 111 carries out image processing on the process target data acquired in step S53. Specifically, CPU 111 selects one history record included in history information 99 that has the smallest sequence number, and carries out the image processing specified by the processing identification information included in the selected history record, on the process target data. In the following step S57, CPU 111 stores into HDD 115 the processed data obtained by executing the image processing. In the case where processed data 97 has already been stored in HDD 115, CPU 111 updates the processed data 97 already stored in HDD 115 with the processed data obtained by executing the image processing.

In the following step S58, CPU 111 sets the processed data as the process target data, and the process proceeds to step S59. In step S59, CPU 111 determines whether there is another history record yet to be selected as a process target. If there is any history record that has not been selected as a process target yet, the process returns to step S56; otherwise, the process proceeds to step S60.

In step S60, CPU 111 forms an image of the process target data, and the process returns to the image generating process. In the case where history information 99 is stored in HDD 115, the process target data is the data obtained by executing the image processing on the basis of history information 99 on the designated data or on processed data 97 stored in HDD 115. If no history information 99 is stored in HDD 115, the process target data is the processed data 97 being stored in HDD 115.

As described above, MFP 100 according to the present embodiment functions as an image processing apparatus. At the time when a data designating operation input by an operation user is accepted, MFP 100 determines the designated data as the process target data. In the case where it is possible to store the process target data into HDD 115 at the time when an execution operation input by the operation user is accepted, MFP 100 carries out the image processing specified by the execution instruction on the process target data, and stores processed data 97 as a result of the image processing into HDD 115, and also determines processed data 97 as the process target data.

On the other hand, in the case where it is not possible to store the process target data into HDD 115 at the time when the execution operation input by the operation user is accepted, MFP 100 stores into HDD 115 history information 99 including the processing identification information for identifying the image processing specified by the execution operation. As the execution operation input by an operation user is stored as the history information, it is unnecessary for the user to input the same execution operation again.

Further, MFP 100 generates a web page which includes a display command linked to the data specified by the position information (URL) indicating the position where the process target data is stored. In the case where history information has been stored, the web page also includes an image processing command to carry out the image processing specified by the processing identification information included in the history information on the process target data. Accordingly, even in the case where there is not a sufficient free space for storing the process target data in HDD 115, it is possible to display an image of the process target data after the same has undergone the image processing. In the case where the process target data can be stored into HDD 115, it is possible to display an image of the processed data obtained by executing the image processing on the process target data. As a result, it is possible to display an image of the data having undergone the image processing, irrespective of the volume of free space available in HDD 115. Further, the end result of the image forming can be confirmed on the screen, without the need to wait until a sufficient free space is secured in HDD 115. Furthermore, in the case where there is a sufficient free space in HDD 115, the process target data is processed data 97 obtained by executing the image processing. This allows the operation user to confirm an image of processed data 97 whose image will be formed actually. As a result, an image of data which is to be formed can be displayed whenever possible.

Furthermore, in the case where history information 99 has been stored in HDD 115 at the time when an image forming operation input by the operation user is accepted, MFP 100 carries out the image processing specified by the processing identification information included in history information 99 on the process target data, on the condition that it is possible to store the process target data into HDD 115, and forms an image of the processed data obtained as a result of the image processing. On the other hand, in the case where no history information has been stored at the time when the image forming operation is accepted, MFP 100 forms an image of processed data 97 which is the process target data. In the case where it is possible to store the process target data into HDD 115, an image of the processed data is formed immediately. In the case where it is not possible to store the process target data into HDD 115, MFP 100 waits until it becomes possible to store the process target data into HDD 115, and forms an image of the process target data after performing the image processing on the process target data on the basis of the history information. This prevents the execution operation input by the operation user from being wasted. The operation user does not have to input the same execution operation again.

While MFP 100 has been described as an example of the image processing apparatus in the above embodiment, the present invention can of course be understood as an image processing method for causing CPU 111 controlling MFP 100 to perform the processing shown in FIGS. 9 to 11, or as a print setup program and an image generating program for causing CPU 111 to execute the image processing method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus comprising:
   a data storing portion to store data;
   an image processing portion to perform image processing on data;
   an operation accepting portion to accept an operation input by a user;
   a target determining portion to determine process target data;
   an image processing control portion operative, in the case where said process target data can be stored into said data storing portion at the time of acceptance by said operation accepting portion of an execution operation instructing execution of image processing executable by said image processing portion, to control said image processing portion to perform the image processing specified by said execution operation on said process target data, and store processed data as a result of the image processing into said data storing portion;
   a history storing portion operative, in the case where said process target data cannot be stored into said data storing portion at the time of acceptance of said execution operation, to store history information including processing identification information for identifying the image processing specified by said execution operation; and
   a page generating portion to generate a page written in a markup language and including a command linked to data that is specified by position information indicating a position where said process target data is stored; wherein
   at the time when a data designating operation of designating data is accepted by said operation accepting portion, said target determining portion determines said designated data as the process target data, and after said process target data has been image-processed by said image processing portion, said target determining portion determines said processed data stored in said data storing portion as the process target data, and
   said page generating portion includes an image processing command generating portion operative, in the case where said history information is stored, to generate an image processing command to perform the image processing specified by the processing identification information included in said history information on said process target data, and said page generating portion generates the page further including the image processing command generated by said image processing command generating portion.

2. The image processing apparatus according to claim 1, further comprising:
   an image forming portion to form an image of data on a recording medium; and
   an image forming control portion to control said image forming portion to form an image of said process target data; wherein
   in the case where said history information has been stored at the time of acceptance by said operation accepting portion of an image forming operation for causing said image forming portion to form an image, said image processing control portion controls said image processing portion to perform the image processing specified by the processing identification information included in said history information on said process target data, on the condition that said process target data can be stored into said data storing portion, and
   in the case where said history information has been stored at the time of acceptance by said operation accepting portion of the image forming operation instructing image forming by said image forming portion, said image forming control portion causes said image forming portion to form an image of processed data which is said process target data image-processed by said image processing portion, and in the case where said history information has not been stored at the time of acceptance by said operation accepting portion of said image forming operation, said image forming control portion causes said image forming portion to form an image of said process target data.

3. The image processing apparatus according to claim 1, further comprising a communication portion to communicate with a computer connected via a network,
   said operation accepting portion including an operation identification information receiving portion to control said communication portion to receive operation identification information for identifying an operation input by a user from a first computer connected to said network,
   the image processing apparatus further comprising a page transmitting portion to control said communication portion to transmit the page generated by said page generating portion to said first computer from which said operation identification information was received.

4. The image processing apparatus according to claim 3, wherein the operation identification information for identifying said data designating operation includes data identification information for identifying data stored in a second computer connected to said network.

5. The image processing apparatus according to claim 1, further comprising a communication portion to communicate with a computer connected via a network, wherein
   said operation accepting portion accepts a data designating operation of designating data stored in the computer connected to said network.

6. The image processing apparatus according to claim 1, wherein
   each time said execution operation is accepted, said target determining portion outputs target data identification information for identifying said processed data that has been determined as the process target data, to said page generating portion, and
   each time said target data identification information is input from said target determining portion, said page generating portion generates said page on the basis of said target data identification information.

7. The image processing apparatus according to claim 1, wherein
   said history storing portion stores history information including image processing identification information for identifying the image processing specified by said accepted execution operation and a sequence number indicating the order of execution, and
   said page generating portion generates an image processing command to perform one or more image processing operations identified respectively by one or more image processing identification information items included in said history information, on said process target data, in accordance with the sequence number(s) included in said history information.

8. The image processing apparatus according to claim 1, further comprising:
a browsing portion operative, in response to reception of a page written in a markup language, to display an image of said input page; and
a page outputting portion to output the page generated by said page generating portion to said browsing portion.

9. The image processing apparatus according to claim 1, further comprising a control portion to control said data storing portion and said image processing portion, wherein
said control portion includes
an application portion formed when an application program is executed, and
an image generating portion formed when an image processing program is executed,
said application portion includes said operation accepting portion and said page generating portion, and
said image generating portion includes said target determining portion, said image processing control portion, and said history storing portion.

10. A non-transitory computer-readable recording medium encoded with an image processing program performed by a computer controlling an image processing apparatus,
said image processing apparatus including
a data storing portion to store data, and
an image processing portion to perform image processing on data,
said computer including an application portion to execute an application program,
the image processing program causing said computer to perform:
a target determining step of determining process target data;
an execution step of, in the case where said process target data can be stored into said data storing portion at the time of acceptance by said application portion of an execution operation instructing execution of image processing executable by said image processing portion, controlling said image processing portion to perform the image processing specified by said execution operation on said process target data;
a processed data storing step of storing processed data as a result of the image processing by said image processing portion, into said data storing portion; and
a history storing step of, in the case where said process target data cannot be stored into said data storing portion at the time of acceptance by said application portion of said execution operation, storing history information including processing identification information for identifying the image processing specified by said execution operation;
said target determining step including steps of
at the time when a data designating operation of designating data is accepted by said application portion, determining said designated data as the process target data,
after said process target data has been image-processed in said execution step, determining said processed data stored in said data storing portion as the process target data, and
each time said execution operation is accepted, outputting, to said application portion, target data identification information for identifying said processed data determined as the process target data, and, in the case where said history information is stored, also outputting, to said application portion, history information identification information for identifying said history information so as to instruct execution of the image processing on the basis of said history information.

11. The non-transitory computer-readable recording medium encoded with the image processing program according to claim 10, wherein
said image processing apparatus further includes an image forming portion to form an image of data on a recording medium,
said image processing program causes said computer to further perform an image forming control step of controlling said image forming portion to form an image of said process target data,
said execution step includes a post-standby execution step of, in the case where said history information has been stored at the time of acceptance by said application portion of an image forming operation for causing said image forming portion to form an image, controlling said image processing portion to perform the image processing specified by the processing identification information included in said history information on said process target data, on the condition that said process target data can be stored into said data storing portion, and
said image forming step includes
a post-standby image forming step of, in the case where said history information has been stored at the time of acceptance by said application portion of the image forming operation instructing image forming by said image forming portion, causing said image forming portion to form an image of processed data which is said process target data image-processed by said image processing portion, and
an immediate image forming step of, in the case where said history information has not been stored at the time of acceptance by said application portion of said image forming operation, causing said image forming portion to form an image of said process target data.

12. The non-transitory computer-readable recording medium encoded with the image processing program according to claim 10, wherein
said application program causes said computer to perform:
an operation accepting step of accepting an operation input by a user; and
a page generating step of generating a page written in a markup language and including a command linked to data specified by position information indicating a position where said process target data is stored, on the basis of said target data identification information output in said target determining step; wherein
said page generating step includes
an image processing command generating step of generating an image processing command to perform the image processing specified by the processing identification information included in said history information on said process target data in the case where said history information has been stored, and
a step of generating the page further including the image processing command in the case where the image processing command is generated in said image processing command generating step.

13. The non-transitory computer-readable recording medium encoded with the image processing program according to claim 12, wherein said image processing apparatus further includes a communication portion to communicate with a computer connected via a network, said operation accepting step includes an operation identification information receiving step of controlling said communication portion to receive operation identification information for identifying an operation input by a user from a first computer connected to said network, and said application program causes said computer to further perform a page transmitting step of controlling said communication portion to transmit the page generated in said page generating step to said first computer from which said operation identification information was received.

14. The non-transitory computer-readable recording medium encoded with the image processing program according to claim 13, wherein the operation identification information for identifying said data designation operation includes data identification information for identifying data stored in a second computer connected to said network.

15. The non-transitory computer-readable recording medium encoded with the image processing program according to claim 12, wherein said image processing apparatus further includes a communication portion to communicate with a computer connected via a network, and said operation accepting step includes a step of accepting a data designating operation of designating data stored in the computer connected to said network.

16. The non-transitory computer-readable recording medium encoded with the image processing program according to claim 12, wherein said target determining step includes a step of outputting target data identification information for identifying said processed data determined as the process target data to said application portion each time said execution operation is accepted, and said page generating step includes a step of generating said page on the basis of said target data identification information each time said target data identification information is received.

17. The non-transitory computer-readable recording medium encoded with the image processing program according to claim 12, wherein said history storing step includes a step of storing history information including image processing identification information for identifying the image processing specified by said accepted execution operation and a sequence number indicating the order of execution, and said page generating step includes a step of generating an image processing command to perform one or more image processing operations identified respectively by one or more image processing identification information items included in said history information, on said process target data, in accordance with the sequence number(s) included in said history information.

18. The non-transitory computer-readable recording medium encoded with the image processing program according to claim 12, wherein said computer further includes a browsing portion formed when a browsing program is executed, the browsing portion being operative, in response to reception of a page written in a markup language, to display an image of said input page, and said application program causes said computer to further perform a page outputting step of outputting the page generated in said page generating step to said browsing portion.

19. An image processing method executed in an image processing apparatus, said image processing apparatus including
a data storing portion to store data, and
an image processing portion to perform image processing on data, said computer including an application portion to execute an application program, the image processing method causing said computer to perform:

a target determining step of determining process target data;

an execution step of, in the case where said process target data can be stored into said data storing portion at the time of acceptance by said application portion of an execution operation instructing execution of image processing executable by said image processing portion, controlling said image processing portion to perform the image processing specified by said execution operation on said process target data;

a processed data storing step of storing processed data as a result of the image processing by said image processing portion into said data storing portion; and a history storing step of, in the case where said process target data cannot be stored into said data storing portion at the time of acceptance by said application portion of said execution operation, storing history information including processing identification information for identifying the image processing specified by said execution operation;

said target determining step including steps of
at the time when a data designating operation of designating data is accepted by said application portion, determining said designated data as the process target data, after said process target data has been image-processed in said execution step, determining said processed data stored in said data storing portion as the process target data, and each time said execution operation is accepted, outputting target data identification information for identifying said processed data determined as the process target data to said application portion.

20. The image processing method according to claim 19, wherein said image processing apparatus further includes an image forming portion to form an image of data on a recording medium, said image processing method causes said computer to further perform an image forming control step of controlling said image forming portion to form an image of said process target data, said execution step includes a post-standby execution step of, in the case where said history information has been stored at the time of acceptance by said application portion of an image forming operation for causing said image forming portion to form an image, controlling said image processing portion to perform the image processing specified by the processing identification information included in said history information on said process target data, on the condition that said process target data can be stored into said data storing portion, and said image forming step includes
- a post-standby image forming step of, in the case where said history information has been stored at the time of acceptance by said application portion of the image forming operation instructing image forming by said image forming portion, causing said image forming portion to form an image of processed data which is said process target data image-processed by said image processing portion, and
- an immediate image forming step of, in the case where said history information has not been stored at the time of acceptance by said application portion of said image forming operation, causing said image forming portion to form an image of said process target data.

* * * * *